(12) United States Patent
Harada et al.

(10) Patent No.: US 7,336,751 B2
(45) Date of Patent: Feb. 26, 2008

(54) POWER CONTROL CIRCUIT AND RADIO TRANSMISSION APPARATUS

(75) Inventors: Hiroshi Harada, Kawasaki (JP); Yoshikazu Nakano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 664 days.

(21) Appl. No.: 10/108,771

(22) Filed: Mar. 28, 2002

(65) Prior Publication Data

US 2003/0103577 A1    Jun. 5, 2003

(30) Foreign Application Priority Data

Nov. 30, 2001  (JP) ............................. 2001-366716

(51) Int. Cl.
*H04L 7/00* (2006.01)
(52) U.S. Cl. ................... 375/365; 375/364; 375/368
(58) Field of Classification Search ............... 375/295, 375/354, 356, 365, 366, 368
See application file for complete search history.

(56) References Cited

U.S. PATENT DOCUMENTS

| | | | |
|---|---|---|---|
| 5,056,109 A | 10/1991 | Gilhousen et al. | |
| 5,093,840 A | 3/1992 | Schilling | |
| 5,265,119 A | 11/1993 | Gilhousen et al. | |
| 5,267,262 A | 11/1993 | Wheatley, III | |
| 5,604,766 A | 2/1997 | Dohi et al. | |
| 5,668,829 A | 9/1997 | Saito | |
| 6,073,025 A * | 6/2000 | Chheda et al. | 455/522 |
| 6,526,261 B1 * | 2/2003 | Takeuchi et al. | 455/69 |
| 6,675,021 B2 | 1/2004 | Shiraki et al. | |
| 6,710,814 B1 * | 3/2004 | Ueno et al. | 348/500 |
| 6,731,606 B2 * | 5/2004 | Lin et al. | 370/252 |
| 6,782,035 B1 | 8/2004 | Nakamura et al. | |
| 6,799,045 B1 * | 9/2004 | Brouwer | 455/453 |
| 6,862,458 B2 * | 3/2005 | Kanemoto et al. | 455/522 |
| 6,865,177 B1 * | 3/2005 | Park et al. | 370/350 |

(Continued)

FOREIGN PATENT DOCUMENTS

EP    0 991 204    4/2000

(Continued)

OTHER PUBLICATIONS

European Search Report dated Jul. 16, 2004.

(Continued)

*Primary Examiner*—Chieh M. Fan
*Assistant Examiner*—Freshteh N Aghdam
(74) *Attorney, Agent, or Firm*—Katten Muchin Rosenman LLP

(57) ABSTRACT

The invention relates to power control of a cellular mobile communication system using TPC, and a power control circuit in a base station set and a radio terminal is equipped with a synchronism detecting unit for detecting synchronism data indicating synchronism establishment from radio data every frame; a synchronism/asynchronism judging unit for judging synchronism/asynchronism based on the synchronism data, an execution/unexecution judging unit for judging execution/unexecution of TPC based on the synchronism data, TPC bits extracting unit for detecting TPC bits contained in the radio data, and a selection control unit for selecting execution/unexecution of transmission power control using the TPC bits based on the judged result and the judged result. 3-Stage control of suspension, execution and unexecution of TPC becomes feasible every frame on the basis of quality, more stable quality can be secured, and increase in the quantity of channel interference can be prevented.

10 Claims, 20 Drawing Sheets

U.S. PATENT DOCUMENTS

| | | | |
|---|---|---|---|
| 6,879,839 B2 * | 4/2005 | Kosugi | 455/522 |
| 2001/0021236 A1 * | 9/2001 | Song | 375/366 |
| 2001/0036165 A1 * | 11/2001 | Suzuki | 370/335 |
| 2002/0054578 A1 * | 5/2002 | Zhang et al. | 370/328 |
| 2004/0062222 A1 * | 4/2004 | Seidel et al. | 370/335 |

FOREIGN PATENT DOCUMENTS

| | | |
|---|---|---|
| EP | 1 089 456 | 4/2001 |
| JP | 8-32513 | 2/1996 |
| JP | 11-112416 | 4/1999 |
| JP | 11-284569 | 10/1999 |
| JP | 2000068874 * | 3/2000 |
| JP | 2000-307512 | 11/2000 |
| WO | WO 98/47246 | 10/1998 |
| WO | WO 01/78292 | 10/2001 |

OTHER PUBLICATIONS

Notice of Rejection mailed on Mar. 7, 2006, with translation.

* cited by examiner

Sf : NUMBER OF STAGES OF FORWARD PROTECTION FOR SYNCHRONISM
Sr : NUNBER OF STAGES OF BACKWARD PROTECTION FOR SYNCHRONISM
Sf' : NUMBER OF STAGES OF FORWARD PROTECTION FOR POWER CONTROL
Sr' : NUMBER OF STAGES OF BACKWARD PROTECTION FOR POWER CONTROL

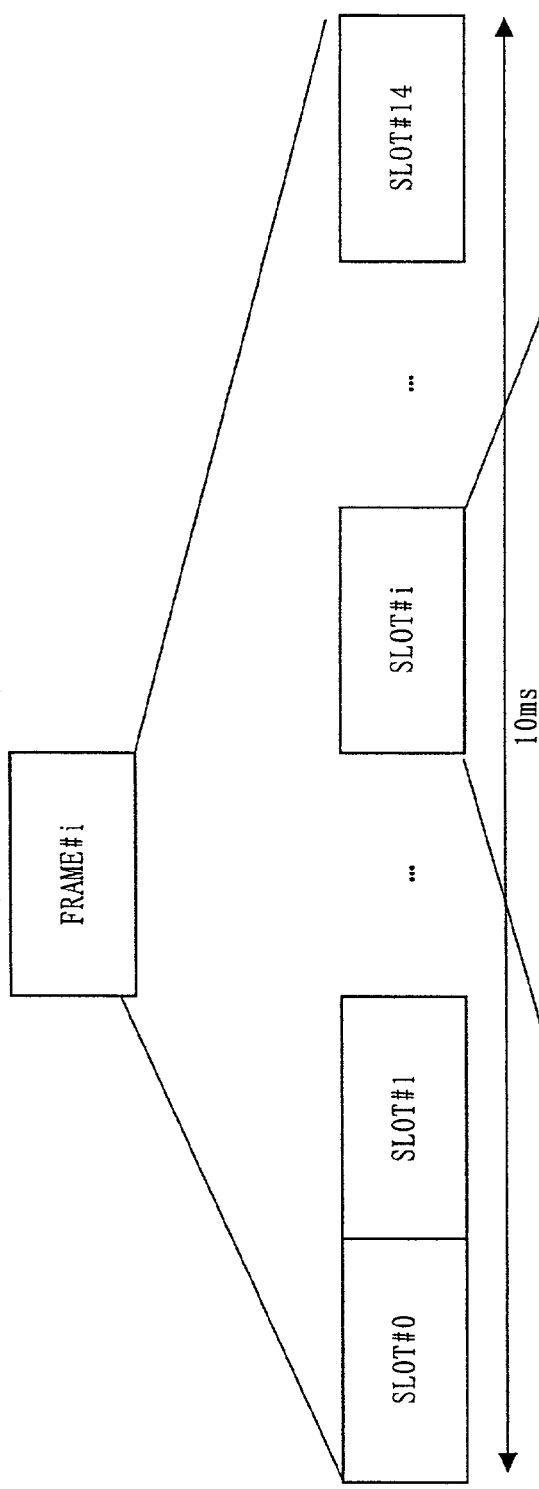
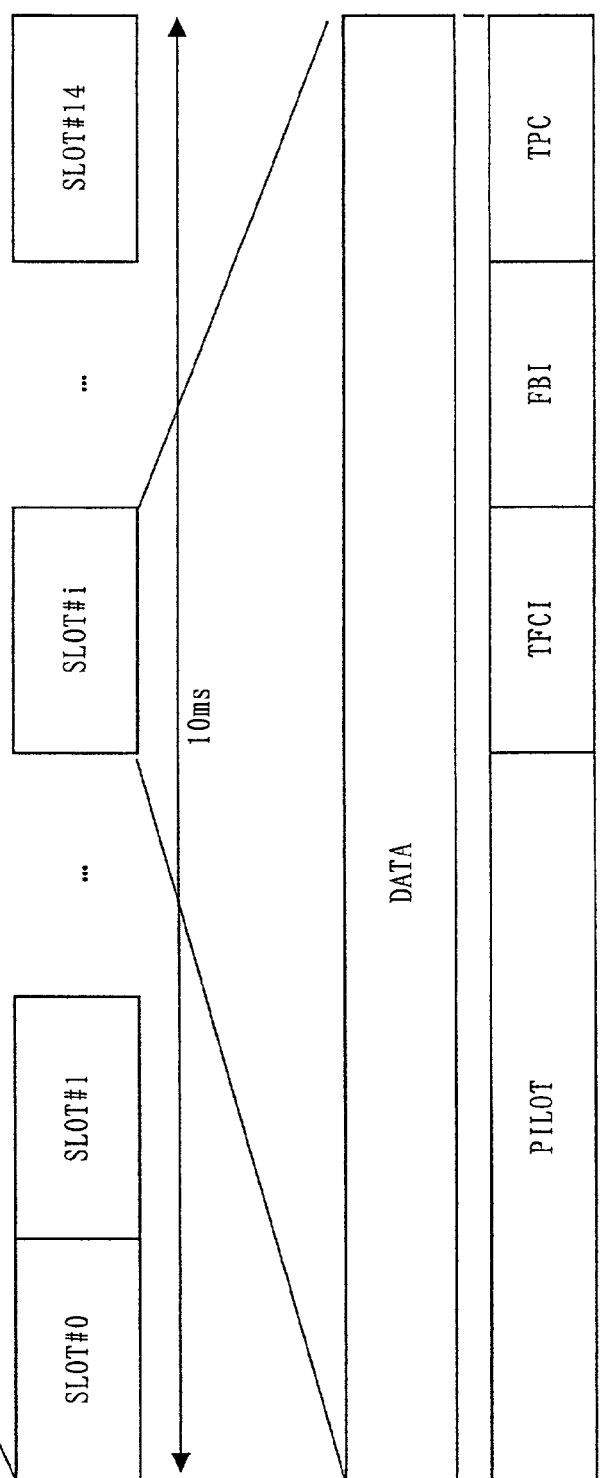
FIG. 6(a)
FIG. 6(b)
FIG. 6(c)

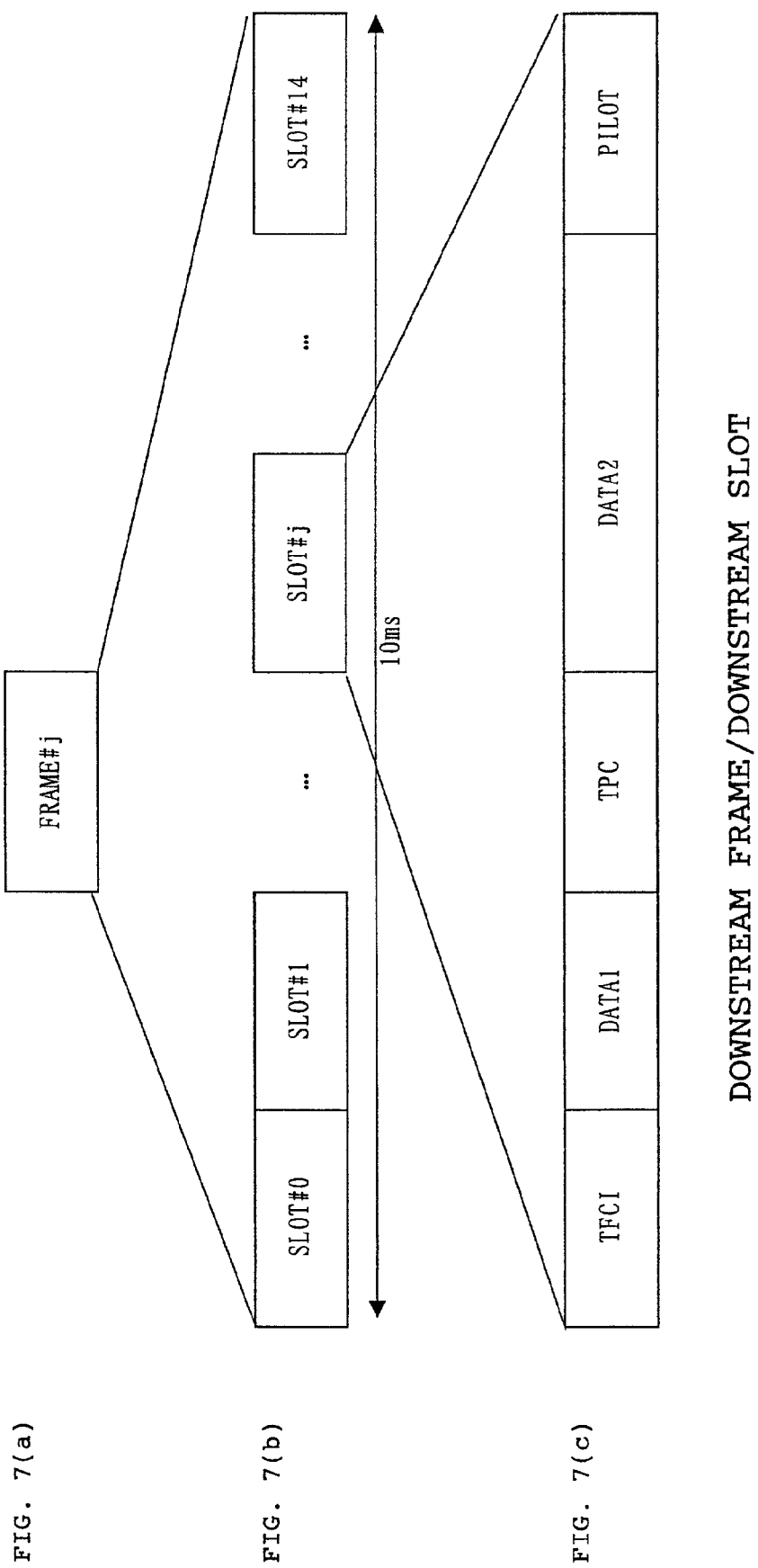

PILOT SYMBOLS OF 90 ( 6×15 ) BITS

FIG. 8 (a) | #0 | #1 | ..... | #14 |

FIG. 8 (b) | PILOT | DATA | TFCI | DATA | TPC |

FIG. 8 (c) | P0 | P1 | P2 | P3 | P4 | P5 |
1 0 1 0 1 0

F I G. 9 (a)
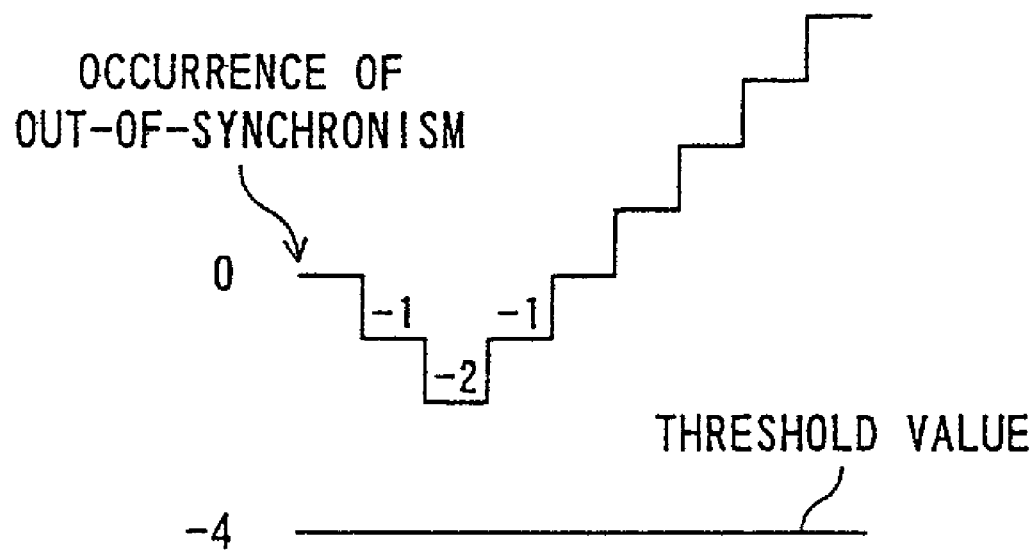
F I G. 9 (b)
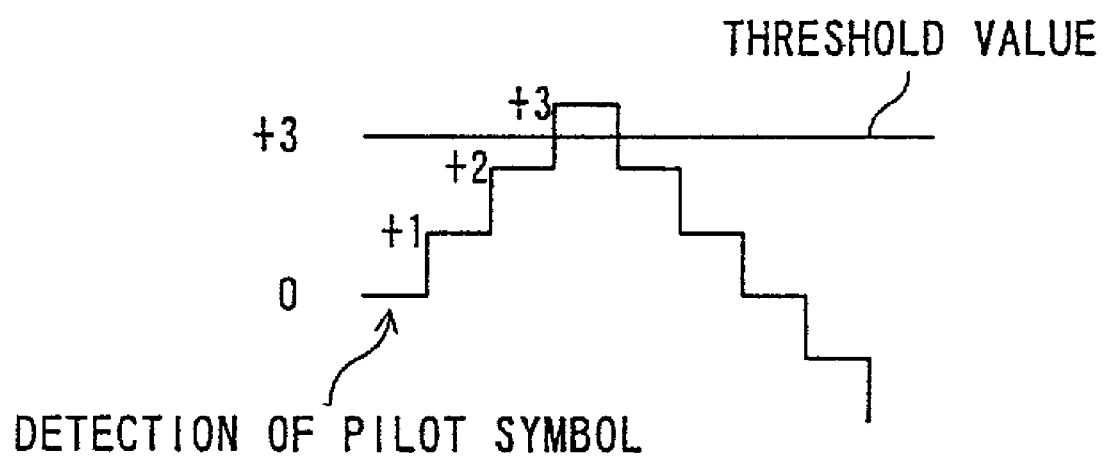

F I G. 1 1
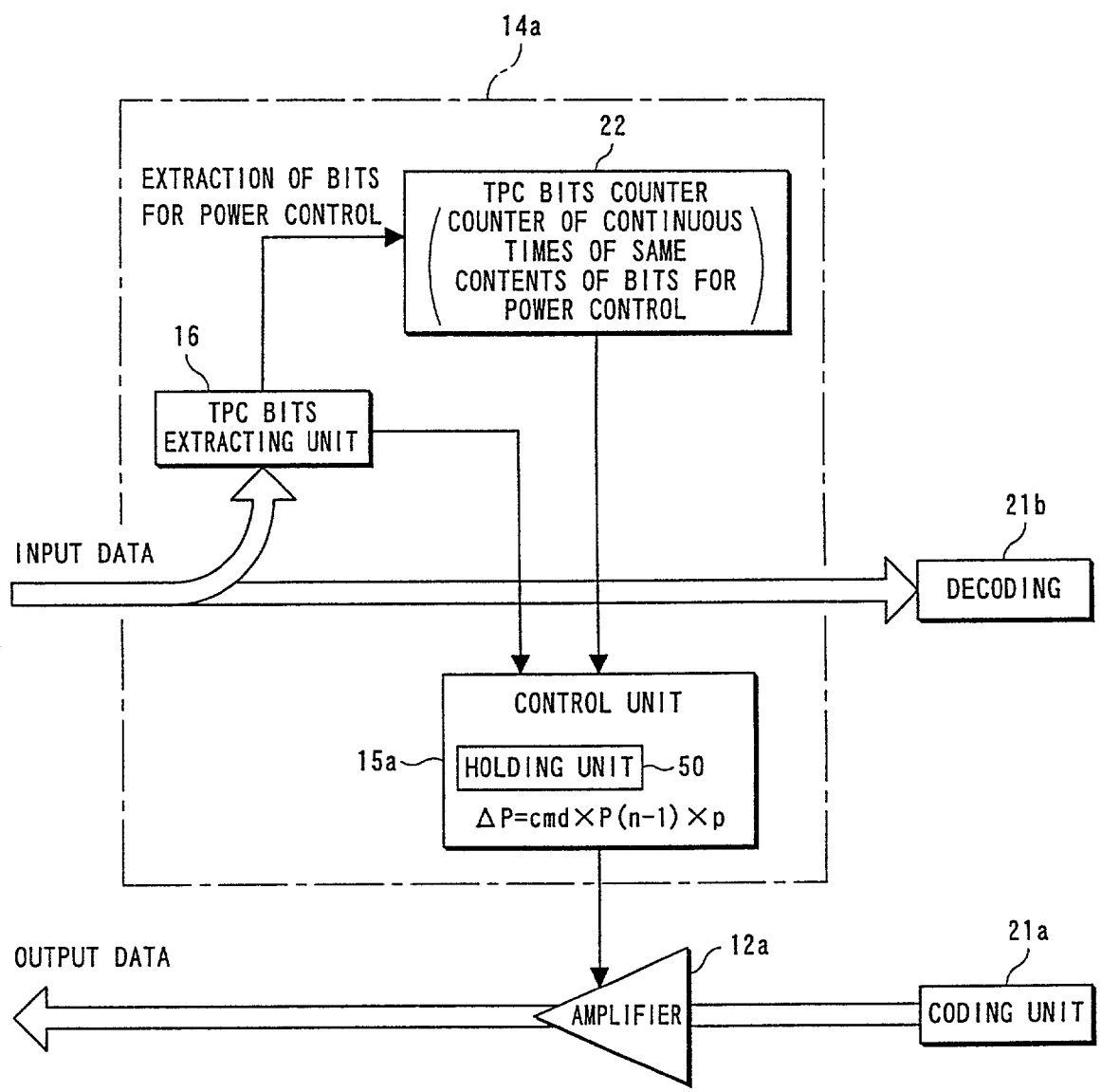

F I G. 1 4
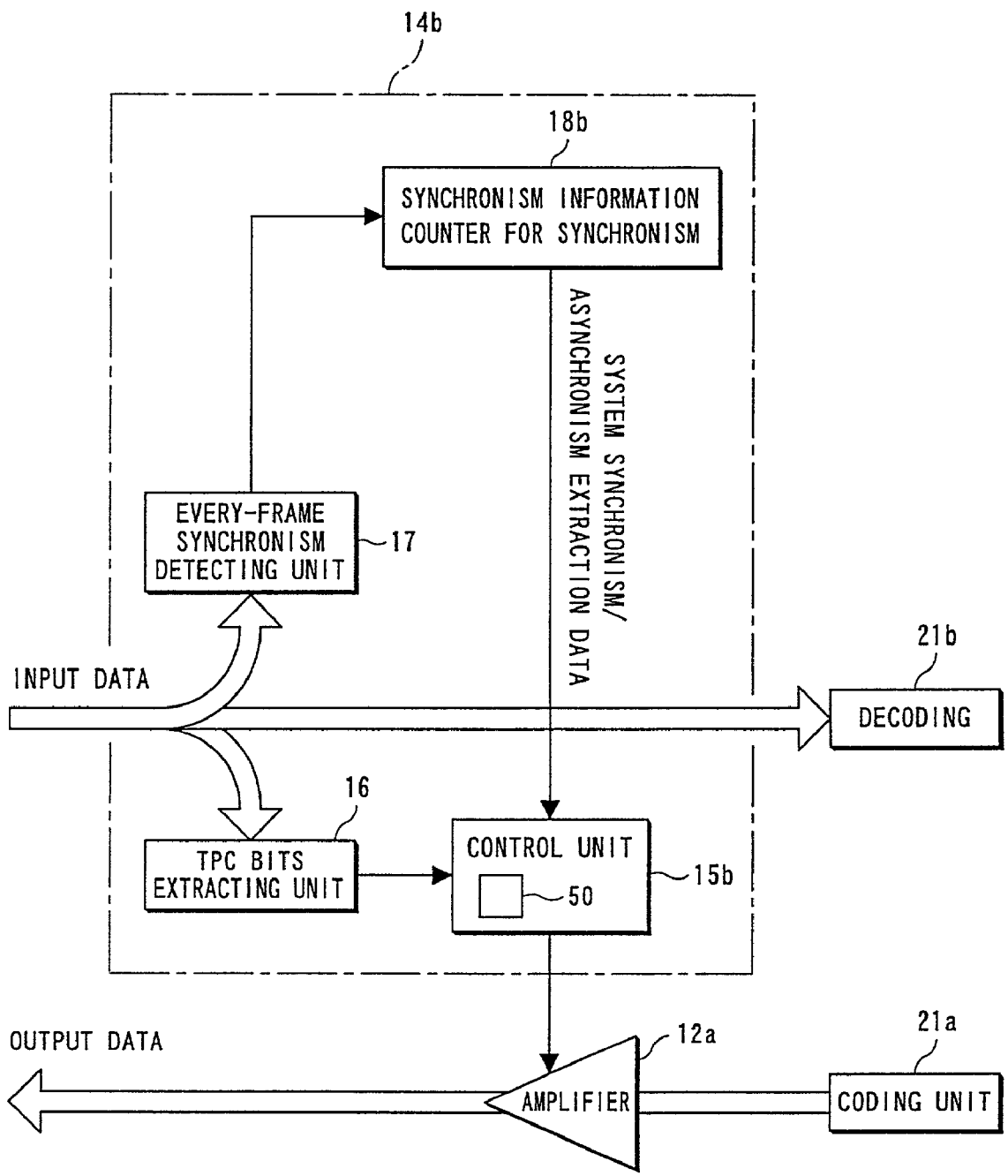

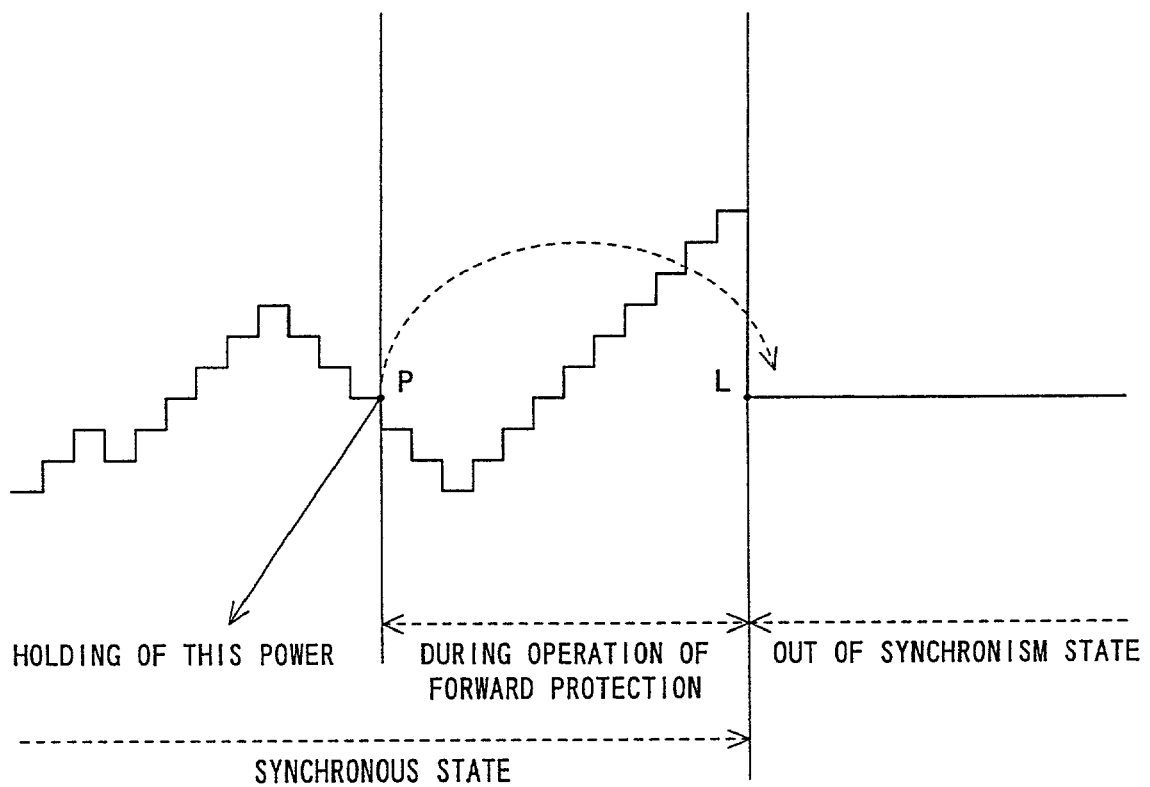
F I G. 1 5

POWER CONTROL CIRCUIT AND RADIO TRANSMISSION APPARATUS

BACKGROUND OF THE INVENTION

1. Field of the Invention

The present invention relates to power control of a radio base transceiver station set (hereinafter referred to as "base transceiver station") and a radio terminal set (hereinafter referred to as "mobile station") and particularly to a power control circuit and a radio transmission apparatus which are suitable for use in a radio system that transmission power is controlled on the basis of access communication quality.

2. Description of the Related Art

In a cellular mobile communication system (radio system) of a wideband-code division multiple access system (hereinafter referred to as "W-CDMA system"), a plurality of mobile stations use carriers (carrier waves) of the same frequency. Accordingly, when the individual mobile stations transmit carriers having identical transmission power irrespective of distance to a base transceiver station, the base transceiver station receives the carrier with a great power value from a mobile station close to the base transceiver station and cannot extract the carrier from a mobile station distant from the base transceiver station to separate it (this is referred to as "near-far problem").

In order to solve this near-far problem, the cellular mobile communication system executes transmission power control (TPC). The TPC means that a mobile station and a base transceiver station control transmission power necessary for communication between them to the necessary minimum power value. A region for inserting TPC bits (TPC information or TPC bits information) is provided in radio channels of the mobile and base transceiver stations, and both mobile station and base transceiver station extract TPC bits from radio signals transmitted by the mobile station or the base transceiver station to select "rise in transmission power"/"drop in transmission power".

The transmission power of the base transceiver station is thereby feedback-controlled by the TPC bits transmitted by the mobile station, and the transmission power of the mobile station is also feedback-controlled by the TPC bits transmitted by the base transceiver station. Accordingly, viewed from the whole cellular mobile communication system, the interference by mobile stations in the base transceiver station is reduced, and so the increase of accommodated users (subscribers) is facilitated.

The judgment as to whether the increase or decrease of the transmission power follows TPC or not has heretofore been made by whether the radio channel in a base transceiver station or a mobile station is established synchronously with the base transceiver station or the mobile station or not. The presence of the synchronism establishment in this radio channel has been judged by whether the base transceiver station or the mobile station can exactly detect a pilot symbol contained in a frame received or not. The pilot symbol is contained in a slot allotted to each user, and a different pattern is allotted to each user. For example, when the base transceiver station receives a pilot symbol "101010" (see FIG. 8(c)), the base transceiver station can recognize that this pilot symbol is one allotted to a certain user. More specifically, the base transceiver station can distinguish pilot symbols in 15 slots #0 to #14 from one another and recognize that they are respectively transmitted by 15 mobile stations. The pattern of a pilot symbol is provided in detail every upstream channel (channel from a base transceiver station to a mobile station) and every downstream channel (channel from the mobile station to the base transceiver station) and according to a bit rate or symbol rate of each channel. The number of bits of this pilot symbol is separately provided in the upstream channel and the downstream channel. With respect to, for example, the pilot symbols of the upstream channel, since each slot has pilot bits (bits respectively indicating pilot symbols) of 6 bits, and 1 frame has 15 slots #0 to #14, the base transceiver station receives pilot bits of 90 bits in 1 frame. The base transceiver station can know the number of bits that can be exactly demodulated and the number of bits that cannot be exactly demodulated among 90 bits and judges synchronism establishment or out-of-synchronism on the basis of this number of bits. In this specification, these 90 bits refer to as "synchronization patterns".

The synchronism detection is used in various setting and mode control in an apparatus, such as on/off control which will be described subsequently, fixing of a window of a searcher and setting of a diversity mode. The on/off control of TPC means control that TPC is made off (not executed) when a base transceiver station and a mobile are out of synchronism, and TPC is made on (executed) when they are synchronized with each other. Control making use of TPC and control making no use of TPC are referred to as "TPC on" and "TPC off", respectively.

As well known, a protective circuit (not illustrated) is provided for frame synchronism detection. This protective circuit has 2 functions, and a first function is a forward protection function that judges to be in a state out of synchronism when changes in synchronization patterns are continuously monitored, and abnormal patterns have been continuously detected prescribed times (hereinafter referred to as "forward protection"). A second function is a backward protection function that judges to be in a state that frame synchronism has been completed or restored when synchronization patterns have been continuously detected prescribed times (hereinafter referred to as "backward protection").

The frame synchronism means synchronism every frame, and system synchronism, which will be described subsequently, means a state this frame synchronism continues prescribed times.

FIG. 20 illustrates an example of state transition as to synchronism. A base transceiver station or a mobile station transfers or changes from a state S100 of synchronism establishment to a state S200 of out-of-synchronism when the out-of-synchronism occurs in the state S100 of synchronism establishment as shown in FIG. 20. Forward protection operation is performed so as to exactly conduct this transition. The base transceiver station or the mobile station transfers to the state S100 of synchronism establishment when the synchronism is restored in the state S200 of out-of-synchronism. Backward protection operation is performed for this transition. These functions are exhibited by means of a counter for forward protection and a counter for backward protection, respectively.

As described above, the cellular mobile communication system makes control by transmitting and receiving TPC bits through the up/downstream channel and judges the synchronized state of radio signals using pilot symbols (synchronization patterns), forward protection and backward protection.

On the other hand, the mobile station is also so constituted that synchronism establishment or out-of-synchronism can be judged by demodulating the downstream channel from the base transceiver station to obtain a pilot symbol of the prescribed number of bits.

Such is the description as to the base transceiver station and mobile station in broad outline.

A transmitting and receiving method of TPC bits will hereinafter be described on both upstream and downstream channels. The details thereof are described in the specification of 3GPP (3rd Generation Partnership Project).

With respect to the upstream channel, the mobile station transmits TPC bits and data of I (In-Phase) and Q (Quadrature) to be transmitted using 2 upstream physical channels (channels for transmitting control information mainly produced by a layer 1). The TPC bits are composed of, for example, 2 bits (4, 8 or 16 bits in some cases). When the TPC bits are "11" ("1111", "11111111" or "1111111111111111"), "rise in transmission power (TPC command: 1)" is represented. When the TPC bits are "00" ("0000", "00000000" or "0000000000000000") by way of example, "drop in transmission power (TPC command: 0)" is represented.

The downstream channel will now be described. In the downstream channel as well, 15 slots #0 to #14 respectively correspond to mobile stations, and the length of the slots #0 to #14 is ($10/15$) ms. With respect to the downstream channel, when the whole bit of the TPC bits of 2 bits (4, 8 or 16 bits in some cases) is "1" or "0", "rise in transmission power (TPC command: 1)" or "drop in transmission power (TPC command: 0)" is represented likewise.

Since the forward protection is used for synchronism detection in the prior art, however, there is a period that asynchronism is not detected even in a state that a synchronization pattern is not exactly recognized. In such a case, there is a high possibility that the TPC bits received by the base transceiver station or mobile station may be erroneously recognized. In addition, since the TPC control is turned on/off by detection of synchronism/asynchronism, erroneous TPC bits transmission control comes to be continued. Thus, an evil that the base transceiver station or mobile station transmits radio signals having a greater power value than the station needs or an excess power value, or that deterioration of quality is advanced has developed.

Further, the base transceiver station or mobile station starts operation of the forward protection when the out-of-synchronism occurs, and continuously transmits a radio signal to the effect that a power value during the operation of the forward protection just before the out-of-synchronism occurs is made a constant power value. In other words, the power value controlled by such erroneous TPC bits as described above is made a constant power value upon asynchronism.

Thus, the base transceiver station or mobile station extracts TPC bits received during the operation of the forward protection when the out-of-synchronism occurs, and the transmission power is not controlled, and transmits a signal, by which a so-called random power value not power-controlled may be taken, with low reliability on the basis of this TPC bits. In other words, there are problems that the base transceiver station or mobile station cannot transmit a signal with the optimum power value, and that the cellular mobile communication system has a possibility that the quality thereof may not be retained.

The base transceiver station or mobile station judges the synchronism establishment and the out-of-synchronism by calculation (mobile calculation or mobile operation) of the error probability of pilot symbols in every frame. Specifically, the base transceiver station or mobile station determines TPC to execute TPC when, for example, at least 5 bits among 90 bits have an error, or not to execute TPC when less than 5 bits have an error. Accordingly, the base transceiver station or mobile station must make a mobile calculation every frame, and deterioration of a receive environment during the mobile calculation cannot be detected, and so a greater power value than the station needs or an excess power value is also used. In other words, there is a problem that the base transceiver station or mobile station cannot exactly stop TPC.

SUMMARY OF THE INVENTION

With the foregoing problems in view, the present invention has been made and has as its object the provision of a power control circuit and a radio transmission apparatus, by which 3-stage control of suspension, execution and unexecution of TPC can be made every frame on the basis of quality in a cellular mobile communication system making use of TPC, more stable quality can be secured, and increase in the quantity of channel interference can be prevented.

To attain the above object, according to the present invention, there is provided a power control circuit comprising a synchronism detecting unit for detecting synchronism/asynchronism from radio data every frame, a synchronism/asynchronism judging unit for judging synchronism/asynchronism on the basis of the detected result for every frame from the synchronism detecting unit, an execution/unexecution judging unit for judging execution/unexecution of transmission power control on the basis of the detected result for every frame in the synchronism detecting unit, a transmission power control information extracting unit for extracting transmission power control information contained in the radio data, and a selection unit for selecting execution/unexecution of transmission power control using the transmission power control information extracted in the transmission power control information extracting unit on the basis of the judged result from the execution/unexecution judging unit.

This power control circuit enables power control to be made according to each of a case following TPC and a case not so, and delicate power control can be made.

According to the present invention, there is also provided a power control circuit comprising a synchronism detecting unit for detecting synchronism/asynchronism from radio data received every frame, a synchronism/asynchronism judging unit for outputting judgment data indicating synchronism/asynchronism by comparison between the number of times that the synchronism detecting unit has continuously detected synchronism or asynchronism and the prescribed threshold value $T_1$, an execution/unexecution judging unit for outputting validity/invalidity data indicating execution/unexecution of transmission power control by comparison between the number of times that the synchronism detecting unit has continuously detected synchronism or asynchronism and the prescribed threshold value $T_2$ ($1 \leq T_2 < T_1$), a transmission power control information extracting unit for extracting transmission power control information contained in the radio data, and a selection unit for selecting execution/unexecution of transmission power control using the transmission power control information extracted in the transmission power control information extracting unit on the basis of the judgment data from the synchronism/asynchronism judging unit and the validity/invalidity data from the execution/unexecution judging unit.

Thus, this power control circuit, high-precision power control becomes feasible, and transmission power control can be speeded up.

According to the present invention, there is further provided a power control circuit comprising a synchronism detecting unit for detecting synchronism/asynchronism from radio data received every frame, an asynchronism judging unit for outputting judgment data indicating asynchronism by comparison between the number of times that the synchronism detecting unit has continuously detected asynchronism and the prescribed threshold value SS1, a transmission power control information extracting unit for extracting transmission power control information contained in the radio data, and a control unit for setting a transmission power value at the time asynchronism has been first detected in the synchronism detecting unit as a transmission power value when the asynchronism judging unit has outputted the judgment data indicating the asynchronism.

With this power control circuit, any value under conditions having low reliability is not used, and good quality can be retained. In addition, the power control is previously started before system synchronism is established, and transmission can be performed at a necessary and sufficient power value.

According to the present invention, there is still further provided a power control circuit comprising a synchronism detecting unit for detecting synchronism/asynchronism from radio data every frame, a synchronism/asynchronism judging unit for judging synchronism/asynchronism on the basis of the synchronism/asynchronism detected every frame in the synchronism detecting unit, a transmission power control information extracting unit for extracting transmission power control information contained in the radio data, an operation unit for extracting a prescribed number of pilot data from the radio data every prescribed number of slots to output operation information as to an error, an execution/unexecution judging unit for judging execution/unexecution of transmission power control on the basis of the operation information outputted from the operation unit, and a selection unit for selecting execution/unexecution of transmission power control using the transmission power control information extracted in the transmission power control information extracting unit on the basis of the judged result from the execution/unexecution judging unit.

This power control circuit permits transmission power to be delicately controlled, and the control can be practiced without greatly changing an existing circuit or the like.

According to the present invention, there is yet still further provided a radio transmission apparatus comprising a transmitter unit for transmitting a first radio signal containing information data at a desired transmission power value, and a power control circuit for controlling the transmission power value in the transmitter unit, wherein the power control circuit comprises a synchronism detecting unit for detecting synchronism/asynchronism from radio data attributable to a second radio signal containing information data and transmission power control information transmitted by the opposite radio apparatus for radiocommunication every frame, a synchronism/asynchronism judging unit for judging synchronism/asynchronism on the basis of the detected result for every frame from the synchronism detecting unit, an execution/unexecution judging unit for judging execution/unexecution of transmission power control on the basis of the detected result for every frame in the synchronism detecting unit, a transmission power control information extracting unit for extracting transmission power control information contained in the radio data, and a selection unit for selecting execution/unexecution of transmission power control using the transmission power control information extracted in the transmission power control information extracting unit on the basis of the judged result from the execution/unexecution judging unit.

Thus, this radio transmission apparatus, more stable quality can be secured, and increase in the quantity of channel interference can be prevented.

According to the present invention, there is yet still further provided a radio transmission apparatus comprising a transmitter unit for transmitting a first radio signal containing information data at a desired transmission power value, and a power control circuit for controlling the transmission power value in the transmitter unit, wherein the power control circuit comprises a transmission power control information extracting unit for extracting transmission power control information contained in radio data attributable to a second radio signal containing information data transmitted by the opposite radio apparatus for radiocommunication, a transmission power control information judging unit for judging execution/unexecution of transmission power control on the basis of the transmission power control information extracted in the transmission power control information extracting unit, and a selection unit for selecting execution/unexecution of transmission power control on the basis of the judged result from the transmission power control information judging unit and transmission power value data corresponding to the judged result.

Thus, this radio transmission apparatus, 3-stage control of suspension, execution/unexecution of TPC can be made every frame on the basis of quality, more stable quality can be secured, and increase in the quantity of channel interference can be prevented.

According to the present invention, there is yet still further provided a radio transmission apparatus comprising a transmitter unit for transmitting a first radio signal containing information data at a desired transmission power value, and a power control circuit for controlling the transmission power value in the transmitter unit, wherein the power control circuit comprises a synchronism detecting unit for detecting synchronism/asynchronism from radio data attributable to a second radio signal containing information data and transmission power control information transmitted by the opposite radio apparatus for radiocommunication every frame, a synchronism/asynchronism judging unit for judging synchronism/asynchronism on the basis of the synchronism/asynchronism detected every frame in the synchronism detecting unit, a transmission power control information extracting unit for extracting transmission power control information contained in the radio data, and a control unit for setting a transmission power value before judged to be asynchronous as a transmission power value when the synchronism/asynchronism judging unit has judged to be asynchronous.

Thus, this radio transmission apparatus, any value under conditions having low reliability is not used, and good quality can be retained.

According to the present invention, there is yet still further provided a radio transmission apparatus comprising a transmitter unit for transmitting a first radio signal containing information data at a desired transmission power value, and a power control circuit for controlling the transmission power value in the transmitter unit, wherein the power control circuit comprises a synchronism detecting unit for detecting synchronism/asynchronism from radio data attributable to a second radio signal containing information data and transmission power control information transmitted by the opposite radio apparatus for radiocommunication every frame, a synchronism/asynchronism judging unit for judging synchronism/asynchronism on the basis of the synchronism/asynchronism detected every frame in the synchronism detecting unit, a transmission power control information extracting unit for extracting transmission power control information contained in the radio data, an operation unit for extracting a prescribed number of pilot data from the radio data every prescribed number of slots to output operation information as to an error, an execution/ unexecution judging unit for judging execution/unexecution of transmission power control on the basis of the operation information outputted from the operation unit, and a selection unit for selecting execution/unexecution of transmission power control using the transmission power control information extracted in the transmission power control information extracting unit on the basis of the judged result from the execution/unexecution judging unit.

In this way, transmission power is delicately controlled, and the control can be practiced without greatly changing an existing circuit or the like.

The operation unit may be so constituted that a mobile calculation is made on the basis of the number of slots to output operation information, whereby transmission power control during execution may be changed to unexecution in the course of reception of one frame, or unexecuted transmission power control may be changed to execution, and so the renewal time of execution/unexecution of TPC is speeded up.

The synchronism/asynchronism judging unit may be so constituted that the number of times that the synchronism detecting unit has continuously detected synchronism/asynchronism is counted to judge synchronism/asynchronism by comparison between the number of continuous times and the prescribed threshold value, whereby the precision of power control is improved. Further, 3-stage control of suspension, execution and unexecution of TPC can be made every frame on the basis of quality, more stable quality can be secured, and increase in the quantity of channel interference can be prevented.

The control unit may be so constituted that execution/ unexecution of the transmission power control is controlled on the basis of respective states of a synchronism-established state indicating radio synchronism establishment, an asynchronous state indicating out-of-radio synchronism and a transient state between the synchronism-established state and the asynchronous state, whereby the selection unit can distinguish between 2 synchronous states of a higher-quality synchronous state and a synchronous state somewhat deteriorated in quality. The selection unit permits making power control according to only the TPC at the time quality is good.

The control unit may be so constituted that a transmission power value held in coordination with a counter value provided in the synchronism/asynchronism judging unit is outputted as a transmission power value, whereby high-precision transmission power control becomes feasible. Judgment as to whether TPC is followed or not is performed at every slot unit, and the number of slots can be selected to the desired number.

The synchronism/asynchronism judging unit may be so constituted that a protective counter for forward protection or backward protection is used as the prescribed threshold value, whereby an existing circuit can be used as it is, and more stable quality can be secured.

The above and other objects, features and advantages of the present invention will become apparent from the following description and the appended claims, taken in conjunction with the accompanying drawings.

BRIEF DESCRIPTION OF THE DRAWINGS

FIGS. 6($a$) through 6($c$) are diagrams respectively illustrating a constitutional example of an upstream frame;

FIGS. 7($a$) through 7($c$) are diagrams respectively illustrating a constitutional example of a downstream frame;

FIGS. 8($a$) through 8($c$) are diagrams respectively illustrating pilot symbols;

FIG. 9($a$) is a diagram illustrating a counter operation of forward protection;

FIG. 9($b$) is a diagram illustrating a counter operation of backward protection;

FIG. 11 is a block diagram illustrating a control method according to the modification of the first embodiment of the present invention;

FIG. 14 is a block diagram illustrating a control method according to the second embodiment of the present invention;

FIG. 15 is a diagram illustrating synchronism transition according to the second embodiment of the present invention;

DESCRIPTION OF THE PREFERRED EMBODIMENTS

The embodiments of the present invention will hereinafter be described with reference to the accompanying drawings.

(A) First Embodiment

A power control method between a base transceiver station and mobile stations in a radio system according to the present invention will hereinafter be described in detail.

Figure 1:
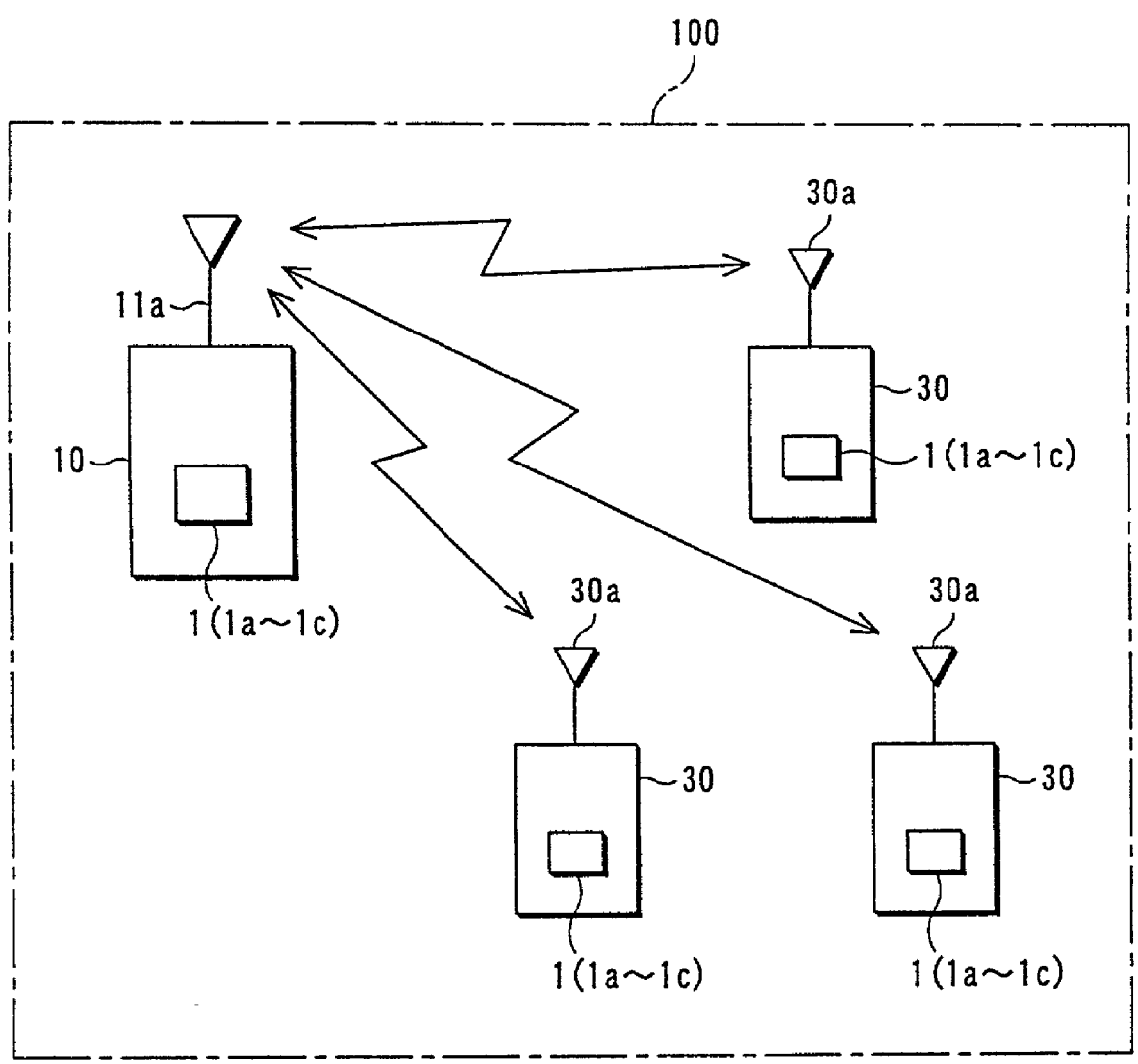
FIG. 1 is a block diagram typically illustrating a cellular mobile communication system according to a first embodiment of the present invention.

(1) Construction of Cellular Mobile Communication System:

FIG. 1 is a block diagram typically illustrating a cellular mobile communication system according to a first embodiment of the present invention. The mobile communication system 100 shown in FIG. 1 uses a W-CDMA system and is composed of a base transceiver station (BTS) 10 and a plurality of mobile stations (MS) 30. Individual units thereof will hereinafter be described in detail.

(1-1) Base Transceiver Station 10, Mobile Station 30:

The base transceiver station 10 is a fixed station, receives radio signals from a plurality of mobile stations 30 to transmit data from the plural mobile stations 30 to an exchange (not illustrated), and transmits multiplexed data from the exchange to the plural mobile stations 30 using the W-CDMA system. The plural mobile stations 30 are portable telephones or portable information terminals which respectively transmit and receive radio signals to and from the base transceiver station 10, and are so constituted that sound signals, text data or the like can be encoded to be transmitted to the base transceiver station 10, and radio signals from the base transceiver station 10 can be decoded to conduct speech communication, e-mail or the like.

These base transceiver station 10 and mobile stations 30 are equipped with a transceiver circuit (functioning as a radio transmission apparatus) 1 that transmits and receives radio signals and performs transmission power control. The base transceiver station 10 and mobile stations 30 respectively have antennas 11a and 30a for transmitting and receiving radio signals, and carriers transmitted by these antennas 11a, 30a are reflected, diffracted or scattered by buildings, mountains and/or the like, and direct waves and reflected waves interfere with each other to cause multipath fading. Accordingly, the carriers transmitted by the base transceiver station 10 and mobile stations 30 go through a plurality of paths to late reach the mobile stations 30 and the base transceiver station 10, and the mobile stations 30 and base transceiver station 10 respectively receive the same carriers plural times. Thus, the mobile stations 30 and base transceiver station 10 each have a plurality of receiver circuits for receiving the same carrier plural times to synthesize them by despreading. Plural carriers generated by delay can be thereby weighted to improve quality (communication quality).

Reference characters 1a to 1c indicated in FIG. 1 designate modified circuits of a transceiver circuit (radio transmission apparatus) 1, which will be described in second and third embodiments (hereinafter referred to as "other embodiments") described below. The cellular mobile communication system 100 is the same construction throughout all the embodiments unless expressly noted.

(1-2) Transmission Power Control:

Since the cellular mobile communication system 100 uses a W-CDMA system, the distance problem occurs. When the individual mobile stations 30 transmit carriers having identical transmission power, the base transceiver station 10 receives the carrier with a great power value from a mobile station 30 close to the base transceiver station 10 and cannot extract the carrier from a mobile station 30 distant from the base transceiver station 10 to separate it. Accordingly, in the cellular mobile communication system 100, TPC bits inserted into a radio channel are used to suitably control transmission power, thereby controlling transmission power necessary for communication between plural mobile stations 30 and the base transceiver station 10 to the necessary minimum power value. Here, the TPC is transmitted and received in both channels of an upstream channel (direction from the base transceiver station to the mobile station) and a downstream channel (direction from the mobile station to the base transceiver station).

(1-2-1) Upstream Frame:

The TPC is transmitted using the upstream channel, and, for example, a physical channel for transmitting control information produced by a layer 1 is used. A constitutional example of an upstream frame will be described by reference to FIGS. 6(a) through 6(c).

FIG. 6(a) illustrates an example of an upstream frame, and the length of the upstream frame #i (i represents a natural number) shown in FIG. 6(a) is 10 ms. FIG. 6(b) illustrates the details of the upstream frame #i, and the upstream frame #i is composed of 15 slots #0 to #14 respectively corresponding to 15 users, each having a length of ($10/15$) ms. FIG. 6(c) illustrates an example of an upstream slot, and a slot #i has both I channel and Q channel. Specifically, each mobile station 30 transmits information data through the I channel and transmits control data through the Q channel.

The control data has respective regions of a pilot symbol (Pilot) for estimation of channel in synchronous detection, a command (TPC) for power control that means "rise in transmission power"/"drop in transmission power", feedback information (FBI) and a transport format combination identifier (TFCI).

FIGS. 8(a) through 8(c) are diagrams respectively illustrating pilot symbols. Since the number of bits of a pilot symbol in each slot is 6 bits as shown in FIG. 8(a), a frame received by the base transceiver station 10 has pilot symbol bits of 90 bits. Six bits of the slot shown in FIG. 8(b) are of such a bit pattern as shown in, for example, FIG. 8(c) The base transceiver station 10 can thereby distinguish between the individual mobile stations 30 and can know that it is normally synchronized with the mobile stations 30.

The TPC is composed of 2 bits (4, 8 or 16 bits in some cases) and provided in such a manner that the whole bit is represented by 1 or 0. A state that the whole bit is 1 or 0 means that a TPC command is on or off. This extremely simplifies error detection. With respect to the number of bits in the TPC bits pattern, a plurality of patterns are provided in the specification, and the number is selected by the cellular mobile communication system 100 on the basis of the specification.

Such is the description as to the upstream channel.

A constitutional example of a downstream frame will now be described by reference to FIGS. 7(a) through 7(c) and FIG. 8(c).

(1-2-2) Downstream Frame:

FIG. 7(a) illustrates an example of a downstream frame, and the downstream frame #j (j represents a natural number) shown in FIG. 7(a) also has slots #0 to #14 corresponding to individual mobile station 30 (see FIG. 7(b)), and the length thereof is 10 ms. The length of each slot is ($10/15$) ms. In detail, the slot shown #j has respective regions of a data region (DATA1), TPC, TFCI, a data region (DATA2) and a pilot symbol region (Pilot) as illustrated in FIG. 7(c). The pattern of the pilot symbol is such that the individual mobile stations 30 can be distinguished as illustrated in, for example, FIG. 8(*c*).

(1-2-3) Control by TPC:

The base transceiver station 10 and the mobile stations 30 extract TPC bits from signals respectively received from the mobile stations 30 and the base transceiver station 10, and the TPC command thereof increases or decreases transmission power according to "rise in transmission power" or "drop in transmission power". When the quality is deteriorated, the base transceiver station 10 or the mobile station 30 keeps the current transmission power constant irrespective of the TPC command.

Thereby, the transmission power of the base transceiver station 10 and the mobile stations 30 is feedback-controlled by the TPC bits from the mobile stations 30 and the base transceiver station 10. Accordingly, the interference by the mobile stations 30 is reduced in the base transceiver station 10, and so the cellular mobile communication system 100 can accommodate more mobile stations 30, and the increase of users is facilitated.

Figure 2:
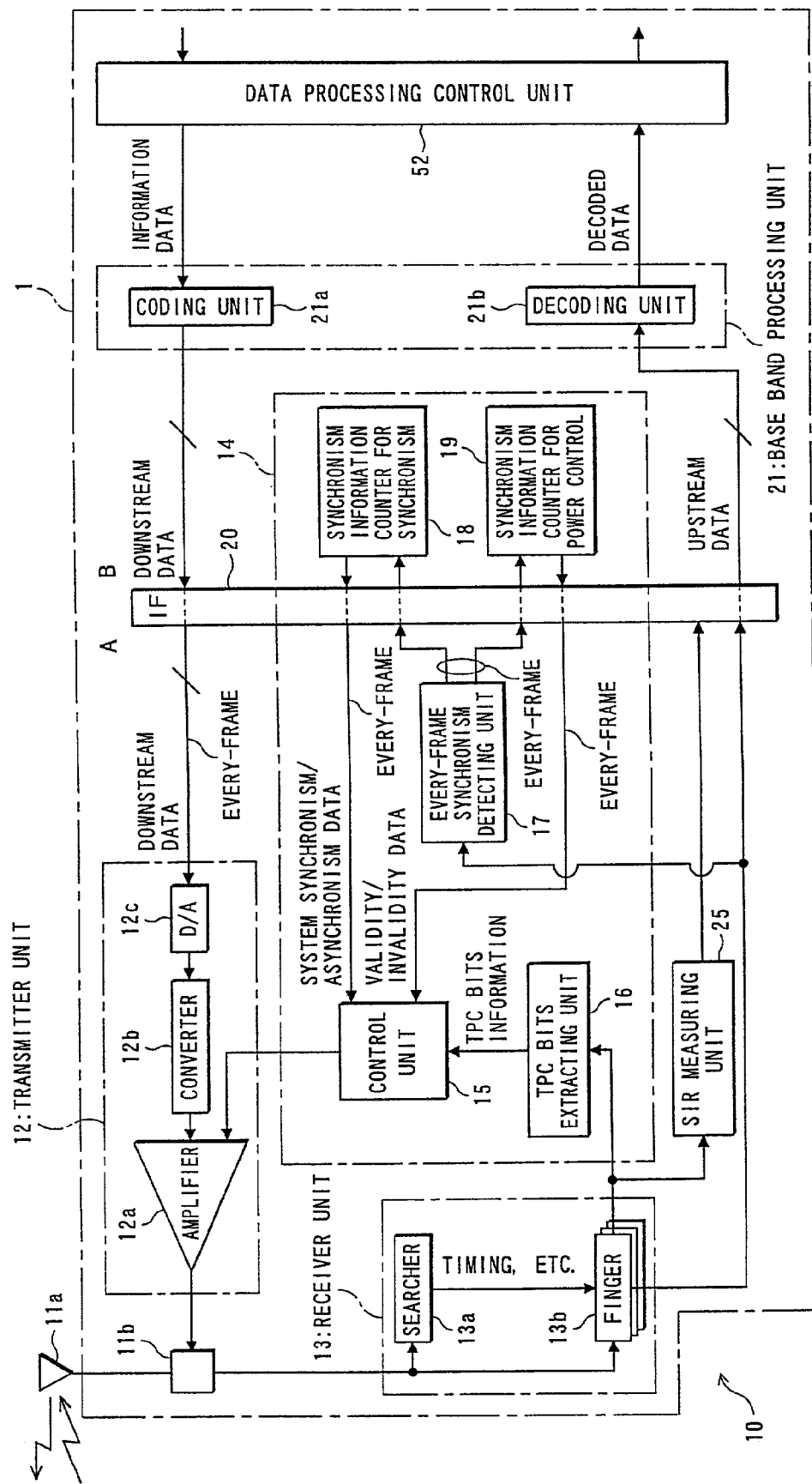
FIG. 2 is a diagram illustrating principal units of a transceiver unit in a base transceiver station according to the first embodiment of the present invention.

(2) Transceiver Circuit (Radio Transmission Apparatus) 1 of Base Transceiver Station 10:

FIG. 2 is a diagram illustrating principal units of a transceiver unit in a base transceiver station 10 according to the first embodiment of the present invention. A transceiver circuit 1 shown in FIG. 2 is equipped with an antenna 11*a*, a coupler 11*b*, a transmitter unit 12, a receiver unit 13, an SIR (Signal Interference Ratio) measuring unit 25, a power control circuit 14, a dual port memory (interface unit) 20, a base band processing unit 21 and a data processing control unit 52.

(2-1) Antenna 11*a*:

The antenna 11*a* serves to transmit and receive radio signals, and antenna diversity by 2 or more antennas is preferably used. The coupler 11*b* serves to output a received signal inputted from the antenna 11*a* to the receiver unit 13 and output a transmission signal inputted from the transmitter unit 12 to the antenna 11*a*.

(2-2) Transmitter Unit 12:

The transmitter unit 12 serves to transmit a radio signal containing information data at a necessary and sufficient power value, has a transmitter amplifier 12*a*, a frequency conversion unit (converter) 12*b* and a D/A (Digital/Analogue) conversion unit 12*c* and also has a spreading unit (not illustrated) for spreading frame data to be transmitted. The transmitter amplifier 12*a* serves to output a signal to be transmitted at a great power value, and, for example, an HPA (High Power Amplifier) is used. The frequency conversion unit 12*b* serves to frequency-convert a base band signal to output an RF (radio frequency) signal. The D/A conversion unit 12*c* serves to convert a digital signal to a analogue signal. The frame data is spread at the spreading unit on the inlet side of the D/A conversion unit 12*c*. The downstream data is thereby amplified and outputted.

(2-3) Receiver Unit 13:

The receiver unit 13 serves to receive radio signals containing information data and TPC bits transmitted by the opposite radio apparatus for radiocommunication and reached through paths and output data for demodulation despread. It has a searcher 13*a* and a finger 13*b* and besides has a frequency conversion circuit for down-converting a radio signal outputted from the coupler 11*b*, an A/D con-verter for A/D-converting the frequency-converted signal and a synthesizer for phase synthesis though not illustrated.

Described in more detail, the function of the receiver unit 13 is realized by a RAKE receiver which improves reception sensitivity, reception signals reached from a plurality of paths are despread to separate signals toward the base transceiver station 10 oneself, 4 waves small in quantity of delay and high in power are distinguished among the signals toward the base transceiver station 10 oneself, and the distinguished 4 waves are synthesized at the maximum ratio to be outputted.

The searcher 13*a* correlatively serves to operate the frequency-converted signal and its own spread code to detect the timing (for example, forefront of the received signal) of the received signal transmitted from the mobile station 10. This function is exhibited by, for example, a digital matched filter. The finger 13*b* serves to despread a plurality of received signals on the basis of the timing from the searcher 13*a* to demodulate them, which is realized by, for example, an LSI (Large Scale Integration) for reception.

The synthesizer serves to put individual phases of plural signals outputted from the finger 13*b* forward or back to conduct RAKE synthesis. Specifically, the synthesizer puts forward the phase of the reception signal by multiplying the reception signal by a positive phase-shifting quantity or puts back the phase of the reception signal by multiplying the reception signal by a negative phase-shifting quantity, thereby synthesize these signals put forward or back in phase. The quantity of delay of the reception signals is thereby controlled. This function is realized by, for example, LSI.

(2-4) SIR Measuring Unit 25 and Data Processing Control Unit 52:

(i) SIR Measuring Unit 25:

The SIR measuring unit 25 serves to measure quality to input information (for example, measured SIR itself or step-wise data as to the quality) as to the quality into the dual port memory 20. Specifically, the SIR measuring unit 25 monitors rotation (phase shift) of the I, Q space axis of the reception signal.

(ii) Data Processing Control Unit 52:

The date processing control unit 52 serves to produce TPC information on the basis of the information as to the quality to lay it on the transmission data. The transmission data containing this TPC information is transmitted to an opposite station (opposite radio apparatus for radiocommunication), and the opposite station increases/decreases the transmission power of its own station. The opposite station means a base transceiver station 10 to a mobile station 30 or a mobile station 30 to a base transceiver station 10.

In the data processing control unit 52 of the base transceiver station 10, thereby, the TPC information containing a TPC command to the effect that "the transmission power is raised" or "the transmission power is dropped" is generated and laid on the data to be transmitted in the transmitter unit 12 to be transmitted from the antenna 11*a*. The mobile station 30 receives and demodulates this radio signal to decode the TPC information, thereby increasing or decreasing the transmission power.

(2-5) Base Band Processing Unit 21:

The base band processing unit 21 serves to encode information data (for example, sound data) to be transmitted and moreover decode the reception data to output the decoded data. It has a encoding unit 21*a* for encoding the information data and a decoding unit 21*b* for decoding the reception data to output the decoded data. These functions are realized by, for example, LSI.

(2-6) Dual Port Memory 20:

The dual port memory 20 is a memory capable of reading and writing data from 2 ports (ports on both sides indicated by A and B). In other words, data written in a specific address is read out from both ports A and B, and desired data can be written in another specific address from the ports A and B. This dual port memory 20 has 2 functions of a frame-producing function of producing a transmission frame and a data holding function.

First, the dual port memory 20 produces a frame with information data (downstream data) and an overhead synthesized. TPC is laid on this overhead on the basis of the SIR measured in the SIR measuring unit 25.

Second, the dual port memory 20 has a function of temporally holding frame data to be transmitted, reception data and data for power control which will be described subsequently.

The information data outputted from the base band processing unit 21 is thereby written once in the dual port memory 20 through the port B, and TPC bits are written to produce a frame to be transmitted. This transmission frame written is taken in CPU (Central Processing Unit) (not illustrated). The frame is spread in a spreading unit (not illustrated) provided in the transmitter unit 12 and inputted in the D/A conversion unit 12c.

On the other hand, the reception data from the finger 13b of the receiver unit 13 is written once in the dual port memory 20 through the port A, and the reception data written is taken in the decoding unit 21 of the base band processing unit 21 by CPU. The data processed in the power control circuit 14, which will be described subsequently, is also temporally held in this dual port memory 20.

As described above, the dual port memory 20 functions as an interface unit between the transmitter unit 12 and receiver unit 13, and the base band processing unit 21.

(2-7) Power Control Circuit 14:

The power control circuit 14 serves to control the transmission power value in the transmitter unit 12 and is equipped with TPC bits extracting unit (transmission power information extracting unit) 16, an every-frame synchronism detecting unit (synchronism detecting unit) 17, a synchronism information counter for synchronism (synchronism/asynchronism judging unit) 18, a synchronism information counter for power control (execution/unexecution judging unit) 19 and a selection control unit (selection unit) 15.

(2-7-1) TPC Bits Extracting Unit 16:

The TPC bits extracting unit 16 serves to detect TPC bits contained in radio data. The TPC bits are contained in an upstream slot shown in, for example, FIG. 6(c). When the TPC bits extracting unit 16 extracts this TPC bits, the TPC bits are inputted in the selection control unit 15.

(2-7-2) Every-frame Synchronism Detecting Unit 17 (See FIG. 2)

The every-frame synchronism detecting unit 17 serves to detect synchronism/asynchronism every frame (every 15 slots) from radio data (radio data received). Specifically, the every-frame synchronism detecting unit 17 outputs synchronism data when a pilot symbol contained in a slot can be exactly decoded, or outputs asynchronism data when a pilot symbol cannot be exactly decoded.

The every-frame synchronism detecting unit 17 informs the interface unit 20 of synchronism data or asynchronism data at every-frame. This function is realized by a logical circuit or the like.

The synchronism/asynchronism data outputted by this every-frame synchronism detecting unit 17 is also referred to as "frame synchronism/asynchronism data" and inputted in both synchronism information counter for synchronism 18 and synchronism information counter for power control 19.

Here, the frame synchronism/asynchronism means synchronism/asynchronism every frame. System synchronism means a state that this frame synchronism has continuously continued prescribed times, while system asynchronism means a state that frame synchronism does not reach the prescribed times or a state out of the system-synchronous state. The information indicating the system synchronism or system asynchronism is referred to as synchronism information.

(2-7-3) Synchronism Information Counter for Synchronism 18:

The synchronism information counter for synchronism 18 serves to judge synchronism/asynchronism on the basis of the detected result every frame in the every-frame synchronism detecting unit 17. Specifically, the number of times that the every-frame synchronism detecting unit 17 has continuously detected synchronism/asynchronism is compared with a threshold value $T_1$ preset to output judgment data indicating synchronism/asynchronism. In order to conduct this judgment, the synchronism information counter for synchronism 18 has a counter function of counting the number of time that frame synchronism has been established and a comparing function. These functions are realized by a counter circuit and a comparing circuit, respectively.

The every-frame synchronism detecting unit 17 outputs frame synchronism/asynchronism data, while the synchronism information counter for synchronism 18 outputs system synchronism/asynchronism data. The synchronism information counter for synchronism 18 judges synchronism/asynchronism on the basis of the synchronism/asynchronism detected every frame by the every-frame synchronism detecting unit 17.

Specifically, the synchronism information counter for synchronism 18 has a counter for backward protection and a monitor circuit which can monitor that this counter value is the prescribed value preset and judges synchronism (system synchronism) between a mobile station 30 and a base transceiver station 10 or asynchronism (system asynchronism) between the mobile station 30 and the base transceiver station 10 by counting, every frame, the number of synchronisms indicating the number of times that the frame has been synchronized and comparing the counter value with the threshold value preset every frame.

FIG. 9(b) is a diagram illustrating a counter operation of backward protection. An interval on an axis of abscissa shown in FIG. 9(b) means frame time, while an interval on an axis of ordinate denotes a counter value. When the every-frame synchronism detecting unit 17 detects a pilot symbol at time 0, the counter value is changed from 0 to +1. When a pilot symbol is detected again in the next frame, the counter value is changed from +1 to +2.

When the synchronism information counter for synchronism 18 presets the threshold value $T_1$ to, for example, +3 and continuously detects the pilot symbol 3 times, the synchronism establishment is informed another module of.

Described in more detail, the synchronism information counter for synchronism 18 reads synchronism data or asynchronism data renewed every frame in the interface unit 20 and increases the counter value in the synchronism information counter for synchronism 18 when the synchronism data is read out, or decreases the same counter value in the synchronism information counter for synchronism 18 when the asynchronism data is read out.

Accordingly, since the synchronism information counter for synchronism 18 does not recognize the establishment of system synchronism even when the pilot symbol is detected once or continuously twice as to forward protection, operation is stabilized. A state that the counter for backward protection is operated is also referred to as "during backward protection stage".

Upon the backward protection for synchronism establishment, the synchronism information counter for synchronism 18 writes system asynchronism data in the interface unit 20 every frame during system asynchronism with the mobile station 30, while CPU reads out the contents in the interface unit 20 at every-frame to be inputted in the selection control unit 15. When the synchronism is established between the base transceiver station 10 and the mobile station 30, the synchronism information counter for synchronism 18 continuously increases the counter value and continuously writes the system asynchronism data in the interface unit 20 until the counter value reaches the threshold value (for example, 5 times). When the counter value reaches 5 times, the synchronism information counter for synchronism 18 judges that the frame synchronism is completed and writes the system synchronism data in the interface unit 20.

The synchronism information counter for synchronism 18 always reads out the system synchronism data or system asynchronism data in the interface unit 20 during the system synchronism to continuously monitor the synchronism. The synchronism information counter for synchronism 18 is so designed that a protective counter for forward protection or backward protection having a threshold value preset is used, whereby an existing circuit can be used as it is.

The forward protection will now be described in detail.

In the case of forward protection, the synchronism information counter for synchronism 18 reads out asynchronism data from the interface unit 20 to start to decrease the counter value and continuously writes system synchronism data in the interface unit 20 until the counter value reaches the threshold value $T_1$ (for example, 4 times). When the counter value reaches 4 times, the synchronism information counter for synchronism 18 judges to be out of the frame synchronism and writes the system asynchronism data in the interface unit 20. The synchronism establishment is thereby protected from deterioration of communication momentarily caused after the synchronism establishment.

FIG. 9(*a*) is a diagram illustrating a counter operation of forward protection. When out-of-synchronism occurs at the time 0, the counter value is changed from 0 to −1. When out-of-synchronism is detected again in the next frame, the counter value is changed from −1 to −2. The synchronism information counter for synchronism 18 presets the threshold value $T_1$ to, for example, −4 and informs another module of the out-of-synchronism for the first time the out-of-synchronism is continuously detected 4 times. Accordingly, the synchronism information counter for synchronism 18 is protected without disconnecting communication even when the out-of-synchronism is detected continuously 3 times as to forward protection. A state that this counter (counter for forward protection) is operated is also referred to as "during forward protection stage".

When the frame synchronism deviated once is restored, the synchronism information counter for synchronism 18 judges synchronism establishment again in accordance with the same procedures as in the backward protection.

The threshold value $T_1$ is an example, and various changes or other modifications may be performed.

As described above, the detected results of the every-frame synchronism detecting unit 17 are used at least in other various setting or change-over like the prior art than on/off of TPC control.

(2-7-4) Synchronism Information Counter for Power Control 19:

The synchronism information counter for power control 19 serves to judge execution/unexecution of TPC on the basis of the every-frame synchronism detecting unit 17. Specifically, the synchronism information counter for power control 19 compares the number of times that the every-frame synchronism detecting unit 17 has continuously detected synchronism or asynchronism with a threshold value $T_2$ ($1 \leq T_2 < T_1$) to output validity/invalidity data indicating execution/unexecution of TPC. "$\leq$" represents equal to or smaller than.

The threshold value $T_2$ of the synchronism information counter for power control 19 is smaller than the threshold value $T_1$ of the synchronism information counter for synchronism 18, and other counter operations than this are substantially the same as those in the synchronism information counter for synchronism 18.

The use of the synchronism information counter for power control 19 permits delicate power control. In other words, upon synchronism establishment, power control can be made according to each of a case following TPC and a case not so.

The threshold value $T_2$ shown below is an example, and various changes or other modifications may be performed.

(i) Backward Protecting Operation:

Upon the backward protection, the threshold value $T_2$ of the synchronism information counter for power control 19 is presets to 3 (smaller value than the threshold value $T_1$=5 of the synchronism information counter for synchronism 18). The synchronism information counter for power control 19 increases the counter value when synchronism date is read out every frame from the interface unit 20, and writes power control validity data in the interface unit 20. This power control validity data written is taken in CPU and inputted in the selection control unit 15. Here, $1 \leq T_2 = 3 \leq T_1 = 5$.

Since the value in the synchronism information counter for synchronism 18 is 3 on the other hand, the synchronism information counter for synchronism 18 still judges to be asynchronous. When synchronism data is continuously obtained twice thereafter, the synchronism information counter for synchronism 18 judges to be system-synchronous.

Since the power control is thereby previously started before system synchronism is established, transmission can be performed at a necessary and sufficient power value.

(ii) Forward Protecting Operation:

Upon the forward protection, the threshold value $T_2$ of the synchronism information counter for power control 19 is presets to 2 (smaller value than the threshold value, 4 of the synchronism information counter for synchronism 18). The synchronism information counter for power control 19 starts to decrease the counter value when asynchronism date is read out from the interface unit 20, and continuously writes system synchronism data in the interface unit 20 until the counter value reaches the threshold value $T_2$ (for example, 2 times). When the counter value reaches 2, the synchronism information counter for power control 19 judges to be out of the frame synchronism and writes the system asynchronism data in the interface unit 20. The synchronism establishment is thereby protected from deterioration of communication momentarily caused after the synchronism establishment.

When the frame synchronism deviated once is restored, the synchronism information counter for power control 19 judges synchronism establishment again in accordance with the same procedures as in the backward protection.

(2-7-5) Selection Control Unit 15:

The selection control unit 15 serves to select execution/unexecution of TPC using the TPC bits detected in the TPC bits extracting unit 16 on the basis of the judged result of the synchronism information counter for power control 19. Specifically, the selection control unit 15 is designed so as to select execution/unexecution of TPC using the transmission power control information detected in the TPC bits extracting unit 16 on the basis of the validity/invalidity data from the synchronism information counter for power control 19. This selection control unit 15 has the following functions.

(i) Function of Controlling Execution/unexecution of TPC:

The selection control unit 15 turns TPC off when judged to be out of synchronism based on the quality or on when judged to be synchronism-established. This control function is realized by causing the selection control unit 15 to cooperate with the SIR measuring unit 25. Specifically, the selection control unit 15 knows the deterioration of any mobile station 30 itself of slots #0 to #14 or a path with the mobile station 30.

The selection control unit 15 is so designed that TPC is executed when both frame synchronism/asynchronism data inputted every frame and validity/invalidity data indicating the execution/unexecution of TPC are satisfied. For example, when the every-frame synchronism detecting unit 17 continuously outputs frame synchronism 5 times, the synchronism information counter for synchronism 18 continuously outputs system asynchronism when the system synchronism is 1 to 4 times, while system synchronism is outputted when the system synchronism continues 5 times.

The execution or unexecution of TPC can be controlled even in the system synchronism.

In such a manner, the base transceiver station 10 can change over from the control based on TPC to the control making no use of TPC before becoming system asynchronism, and so no TPC control by an erroneous TPC bits are executed. The down power is stabilized in a state that the up quality is deteriorated, and increase in the quantity of down interference can be prevented.

When the pilot symbol of the radio signal transmitted from the base transceiver station 10 cannot be received to become out of the synchronism, the selection control unit 15 of the mobile station 30 invalidates TPC to perform transmission at a constant power level.

(ii) State Diagram of Selection Control Unit 15:

The selection control unit 15 manages synchronism/asynchronism in 3 states upon control.

Figure 4:
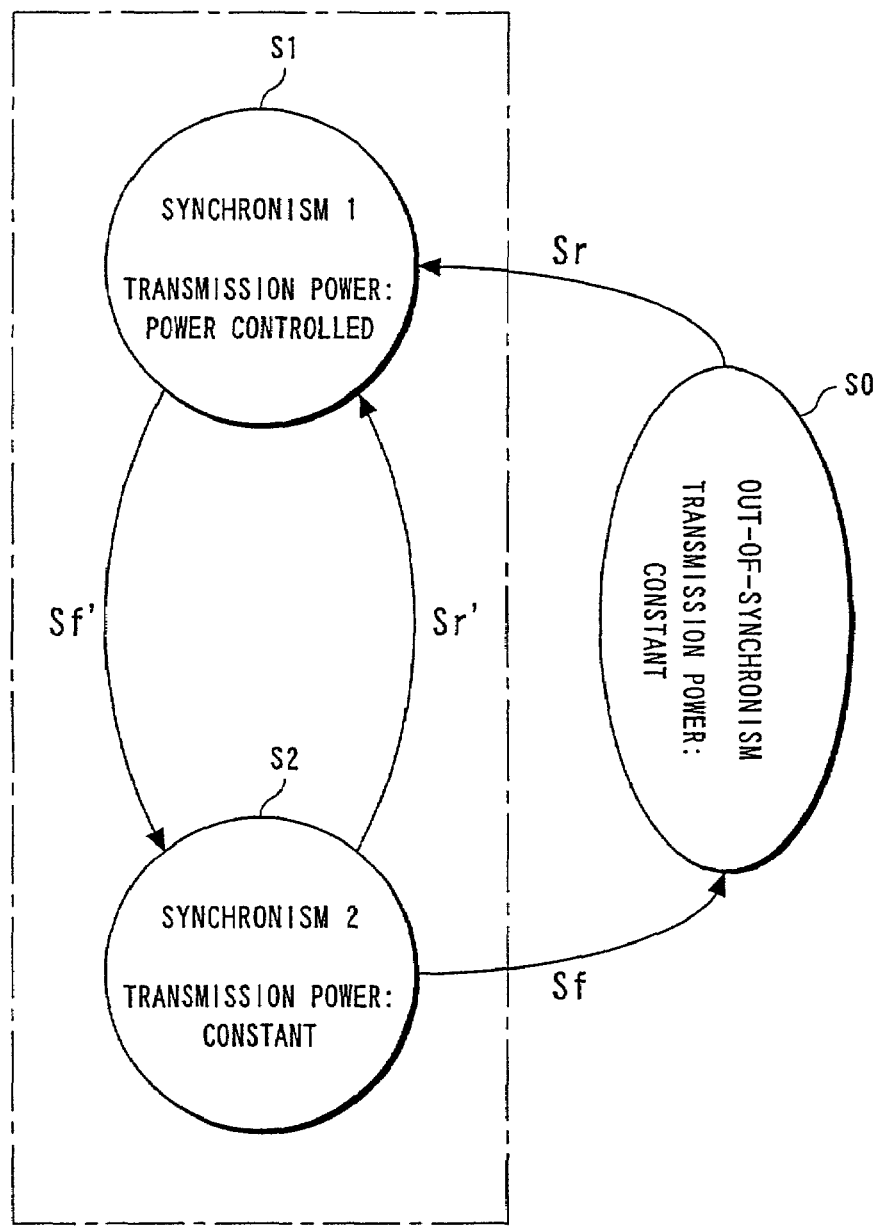
FIG. 4 is a diagram illustrating an example of state transition of a control unit according to the first embodiment of the present invention.

FIG. 4 is a diagram illustrating an example of state transition of the selection control unit 15 according to the first embodiment of the present invention. A state S0 shown in FIG. 4 is a state out of synchronism, in which transmission power is constant, a state S1 is a state that synchronism has been established, and transmission power control is executed (hereinafter referred to as "Synchronism 1"), and a state S2 is a state that synchronism has been established, and transmission power control is unexecuted (hereinafter referred to as "Synchronism 2").

In other words, the conventional selection control unit has managed synchronism by 2 states of a state of synchronism establishment and a state out of synchronism. In the selection control unit 15 according to the present invention, however, the state of synchronism establishment is further divided into 2 states, Synchronism 1 and Synchronism 2, and the synchronism is managed by 3 states combined with the state out of synchronism. Synchronism 1 indicates synchronism establishment in a high-quality state, and Synchronism 2 indicates synchronism establishment in a state somewhat deteriorated in quality compared with Synchronism 1. The standard as to whether the quality is good or deteriorated is achieved by, for example, monitoring the output of the SIR measuring unit 25.

Accordingly, the selection control unit 15 is so constituted that execution/unexecution of TPC is controlled on the basis of respective states of a synchronism-established state indicating radio synchronism establishment, an asynchronous state indicating out-of-radio synchronism and a transient state between the synchronism-established state and the asynchronous state. With respect to the control making use of these 3 states, the same shall apply to the following other embodiments unless expressly noted.

With respect to transition between the respective states, the transition from the out-of-synchronism to Synchronism 1 is caused by the fact Sr that the counter value for backward protection exceeds the threshold value (number of stages of forward protection for synchronism), and the transition from Synchronism 2 to the out-of-synchronism is caused by the fact Sf that the counter value for forward protection exceeds the threshold value (number of stages of backward protection for synchronism).

The transition from Synchronism 2 to Synchronism 1 is caused by the fact Sr' that the counter value in the counter for backward protection exceeds the threshold value (number of stages of backward protection for power control), and the transition from Synchronism 1 to Synchronism 2 is caused by the fact Sf' that the counter value in the counter for forward protection exceeds the threshold value (number of stages of forward protection for power control).

These 3 states correspond to the threshold values (or the number of stages of protection) of the system synchronism data or system asynchronism data (synchronism information) indicating Synchronism 1, Synchronism 2 and the out-of-synchronism. In other words, when the counter value is equal to the counter value in the synchronous state, the transition among Synchronism 1, Synchronism 2 and the out-of-synchronism and the transition between Synchronism 1 and Synchronism 2 are performed at the same time.

The selection control unit 15 can distinguish between 2 synchronous states of a higher-quality synchronous state (Synchronism 1) and a synchronous state (Synchronism 2) somewhat deteriorated in quality. The selection control unit 15 permits power control to follow TPC in the case of Synchronism 1 and to be held constant in the case of Synchronism 2.

The functions of the selection control unit 15 are realized by causing CPU, ROM (Read Only Memory) and RAM (Random Access Memory) to cooperate with one another.

As described above, power control can be made according to only the TPC at the time quality is good upon connection, whereby the transmission power control becomes feasible according to only the transmission power control at the time quality is good.

Figure 3:
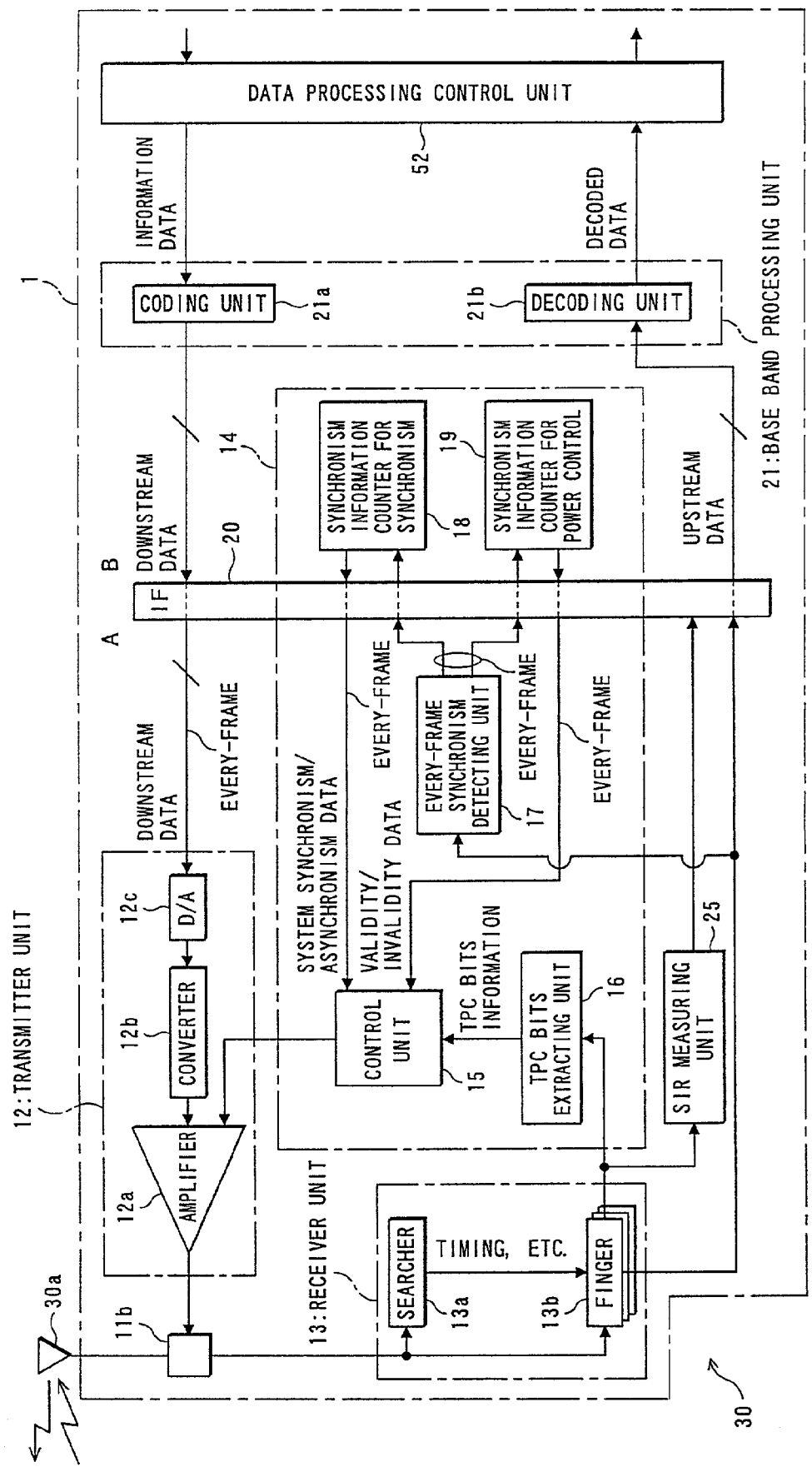
FIG. 3 is a diagram illustrating principal units of a transceiver unit in a mobile station according to the first embodiment of the present invention.

(3) Transceiver Circuit (Radio Transmission Apparatus) 1 of Mobile Station 30:

FIG. 3 is a diagram illustrating principal units of a transceiver unit in a mobile station 30 according to the first embodiment of the present invention. The mobile station 30 shown in FIG. 3 has the same transceiver circuit 1 as the transceiver circuit 1 in the base transceiver station 10, and an antenna 30a for transmitting and receiving radio signals. Those having the same reference characters as those described above among those shown in FIG. 3 mean like units or units having like functions, and their descriptions are omitted.

The transceiver circuit 1 used in the mobile station 30 may be a transceiver circuit different in outer shape, size, etc. from that provided in the base transceiver station 10 in some cases. In the transceiver circuit 1 of the mobile station 30, members different in heat resistance, durability, etc. from those in base transceiver station 10 may be used so as to match a difference in service environment between the base transceiver station 10 and the mobile station 30. Further, members used and the like may be varied according to price.

The commonality of units is thereby permitted because the base transceiver station 10 and the mobile station 30 have the same constitution, so that development cost and unit cost can be reduced. The mobile station 30 can be feedback-controlled substantially contrastively to the base transceiver station 10.

In the data processing control unit 52 of the mobile station 30, thereby, the TPC information containing a TPC command to the effect that "the transmission power is raised" or "the transmission power is dropped" is generated and laid on the data to be transmitted in the transmitter unit 12 to be transmitted from the antenna 30a. The base transceiver station 10 receives and demodulates this radio signal to decode the TPC information, thereby increasing or decreasing the transmission power.

(4) Operation:

The operation of the cellular mobile communication system 100 constituted as described above will hereinafter be described in detail with reference to FIG. 5.

Figure 5:
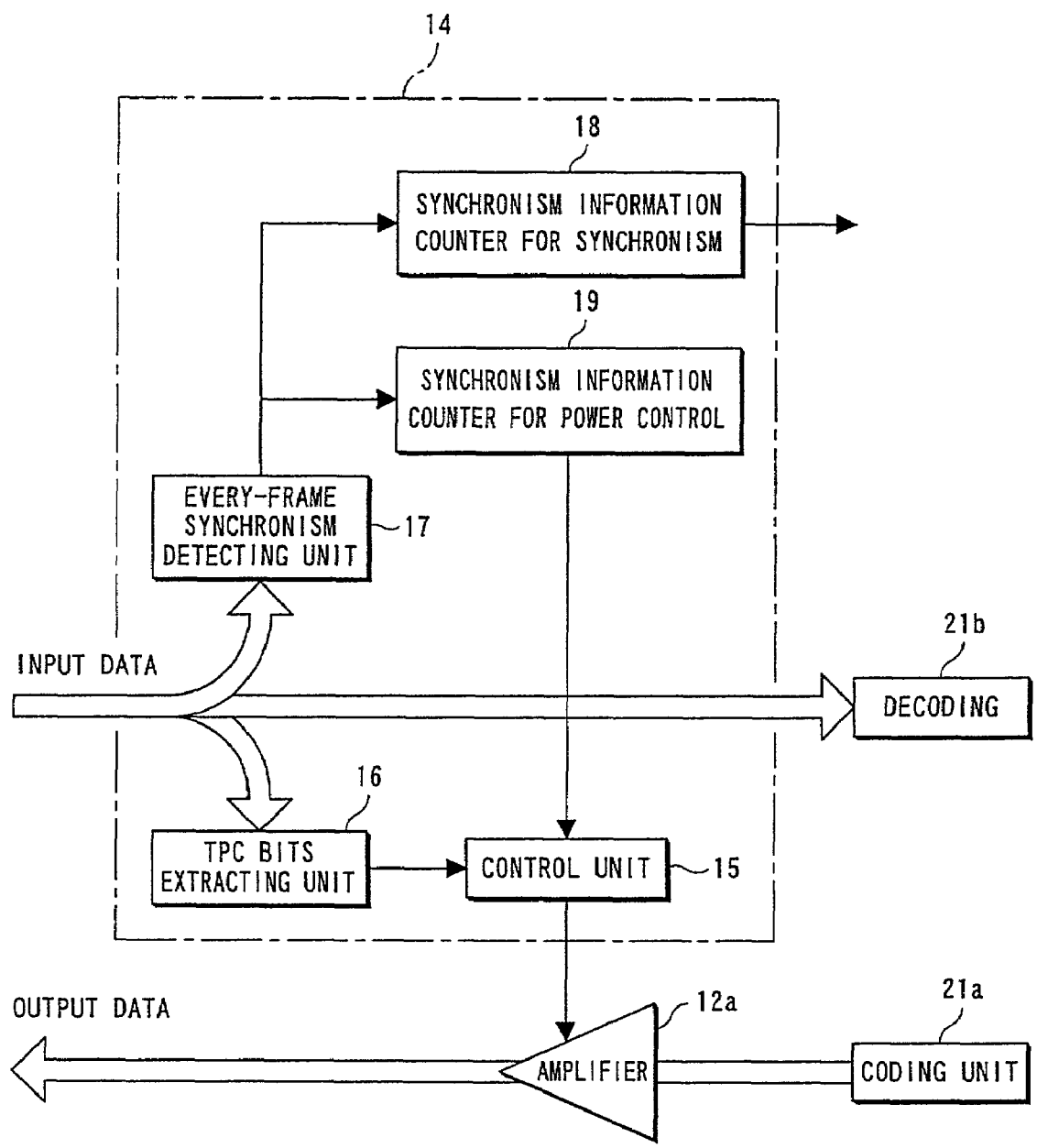
FIG. 5 is a block diagram illustrating a control method according to the first embodiment of the present invention.

FIG. 5 is a block diagram illustrating a control method according to the first embodiment of the present invention. Input data is judged to be synchronous or asynchronous every frame in the every-frame synchronism detecting unit 17, and this frame synchronism/asynchronism data (frame synchronism data or frame asynchronism data) is read in both synchronism information counter for synchronism 18 and synchronism information counter for power control 19. The frame synchronism/asynchronism data or counter value read in these counters may also be used for the layer processing. The interface unit 20 is not illustrated.

(4-1) Selection as to Whether Transmission Power is Followed by TPC or Held at Constant Power Level:

The synchronism information counter for synchronism 18 starts to count for backward protection to judge synchronism/asynchronism every frame. At the same time, synchronism information counter for power control 19 also starts to count for power control to judge whether power control is performed according to TPC or not. The judged result in the synchronism information counter for power control 19 is directed to the selection control unit 15, and the selection control unit 15 controls the transmission power so as to be followed by TPC or be held at a constant power level.

(4-2) Transmission Power Control in Base Transceiver Station:

In the finger 13b, the same radio signals through, for example, 4 different paths are despread, and the despread signals are subjected to RAKE synthesis in a synthesizer. SIR of the signal subjected to the RAKE synthesis is measured in the SIR measuring unit 25 and inputted in the dual port memory 20. A transmission frame into which TPC has been inserted is produced in the dual port memory 20 and transmitted.

When the mobile station 30 receives a command thereof, the transmission power is increased or decreased according to the command. Accordingly, the transmission power of the base transceiver station 10 is determined on the basis of the information transmitted to the base transceiver station 10 from the mobile station 30 to perform closed loop control.

(4-3) Power Control Using Closed Loop:

Each of the mobile stations 30 measures SIR as to radio signals received, and this SIR is fed back to the base transceiver station 10. The base transceiver station 10 feedback-control the transmission power of its own station (base transceiver station 10) on the basis of the SIR measured by the mobile station 30. The base transceiver station 10 holds an SIR threshold value as to the radio signal received by the mobile station 30 in advance. This SIR threshold value is compared with the SIR in the mobile station 30, and the transmission power is raised when the SIR in the mobile station is smaller than the SIR threshold value. The base transceiver station 10 measures SIR in the base transceiver station 10 as to a pilot signal transmitted from the mobile station 30, and transmits TPC bits to the mobile station 30 on the basis of the SIR in the base transceiver station 10.

The cellular mobile communication system 100 realizes the operation one time per 0.625 ms, and TPC is rapidly performed.

As described above, cellular mobile communication system can suitably control transmission power without using power control in the mobile station 30 on the transmission side against variations of reception level caused by fading and permits minimizing transmission power.

Further, since the power control circuit 14 according to the present invention is provided with the counter for power control protection, which judges power control validity/invalidity, in addition to the counter for synchronism protection, which judges synchronism establishment, as described above, high-precision power control becomes feasible.

In the prior art, when a base transceiver station erroneously recognizes TPC, the control is continued in the erroneous state, and so the base transceiver station transmits a radio signal at an excess power value, and this excess power value facilitates deterioration of quality. According to the present invention, however, power control can be made according to both cases of a case following TPC and a case not so, and delicate control can be made.

The power control method is not limited to the foregoing embodiment, and various changes or other modifications may be suggested.

(5) Modifications

The control can also be executed by monitoring the number of times that the base transceiver station 10 has continuously received the TPC bits.

Figure 10:
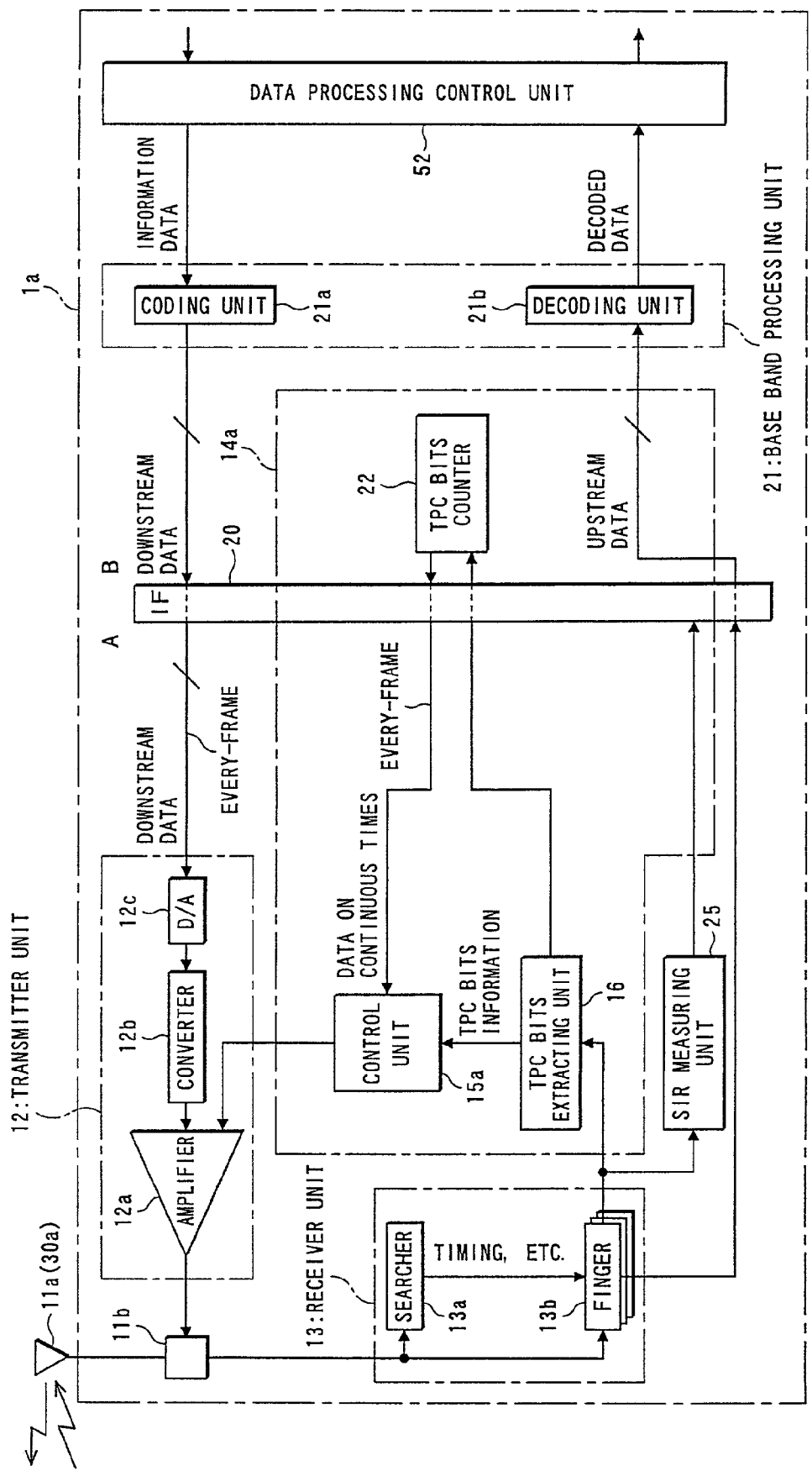
FIG. 10 is a diagram illustrating principal units of a transceiver unit in a base transceiver station according to a modification of the first embodiment of the present invention.

(5-1) Constitution of Principal Units of Transceiver Unit:

FIG. 10 is a diagram illustrating principal units of a transceiver unit in a base transceiver station according to a modification of the first embodiment of the present invention. The transceiver circuit (radio transmission apparatus) la of the base transceiver station 10a shown in FIG. 10 has a power control circuit 14a containing 3 units of a selection control unit 15a, TPC bits extracting unit 16 and TPC bits counter (transmission power control information judging unit) 22. Those having the same reference characters as those described above among those shown in FIG. 10 mean like units or units having like function(s), and their descriptions are omitted.

(5-2) TPC Bits Counter 22:

The TPC bits counter 22 serves to count the number of times that the TPC bits extracting unit 16 has continuously detected TPC bits and output the number of continuous times. This function is realized by a counter circuit (not illustrated) and a judgment circuit (not illustrated). Specifically, the counter circuit counts the number of times that TPC bits of the same contents have been continuously received, and the counter value is monitored by the judgment circuit to input the number of times that the TPC bits have been received as data as to the number of continuous times in the selection control unit 15a. The data as to the number of continuous times is outputted as data of the number of times such as 3 times or 4 times. Besides, 0 is outputted when the TPC bits cannot be demodulated.

The TPC bits counter 22s is so constituted that the identity of the TPC bits are inspected when the counter value increases, whereby the precision of the power control is improved.

(5-3) Selection Control Unit 15a:

The selection control unit 15a serves to select execution/unexecution of TPC on the basis of the number of continuous times outputted from the TPC bits counter 22 and the transmission power value data corresponding to this number of continuous times and indicating the transmission power control value (controlled variable of transmission power or transmission power step or transmission power width).

The selection control unit 15a has a holding unit 50 (see FIG. 11). The holding unit 50 holds the number of continuous times that the TPC bits has been continuously extracted and the transmission power control value corresponding to this number of continuous times in coordination with each other. For example, ROM is used as the holding unit. The ROM may also be provided outside the selection control unit 15a.

The power control in the selection control unit 15a will be described with reference to FIGS. 11 and 12.

FIG. 11 is a block diagram illustrating a control method according to the modification of the first embodiment of the present invention. In the power control circuit 14a shown in FIG. 11, those having the same reference characters as described above mean like units. Data inputted is inputted in the TPC bits extracting unit 16. In this TPC bits extracting unit 16, TPC bits are extracted, and the fact that the TPC bits has been extracted is inputted in the TPC bits counter 22 to increase the counter value in the TPC bits counter 22. When no TPC bits are extracted in the TPC bits extracting unit 16 on the other hand, the counter value in the TPC bits counter 22 is not increased. The TPC bits counter 22 inputs the number of continuous TPC bits extractions in the selection control unit 15a. The TPC bits counter 22 may also be so designed that the counter value is decreased when no TPC bits are extracted.

In other words, the TPC bits extracting unit 16 takes out TPC bits contained in the input data. This TPC bits are compared with last contents. The counter value in the TPC bits counter 22 is increased when both TPC bits are of the same information, or the TPC bits counter 22 is reset when both TPC bits are of different information. The TPC bits extracting unit 16 inputs the number of continuous TPC bits extractions in the selection control unit 15a.

The selection control unit 15a makes the transmission power control value variable and determines the value according to the number of continuous extractions of the same contents in TPC. In other words, the selection control unit 15a calculates out the transmission control value in accordance with the following equation (W1):

$$\Delta P = cmd * P(n-1) * p \qquad (W1)$$

wherein $\Delta P$ means the transmission power control value, cmd denotes the contents (any one of rise in power and drop in power) of TPC, * stands for multiplication, n represents the number of continuous extractions of the same contents in TPC, P(n) means a weighting function (monotonic change to n), and p denotes power control unit.

The selection control unit 15a inputs the transmission power control value $\Delta P$ obtained by the equation (W1) in the transmitter amplifier 12a, whereby rise or drop in the transmission power is performed.

The TPC bits counter 22 thereby recognizes what times the TPC has continuously received information having the same contents, and the selection control unit 15a changes the transmission power value of the transmission power control according to this number of continuous times.

Random control state not power-controlled during counter operation for the forward protection in the state of synchronism establishment is thereby avoided.

Figure 12:
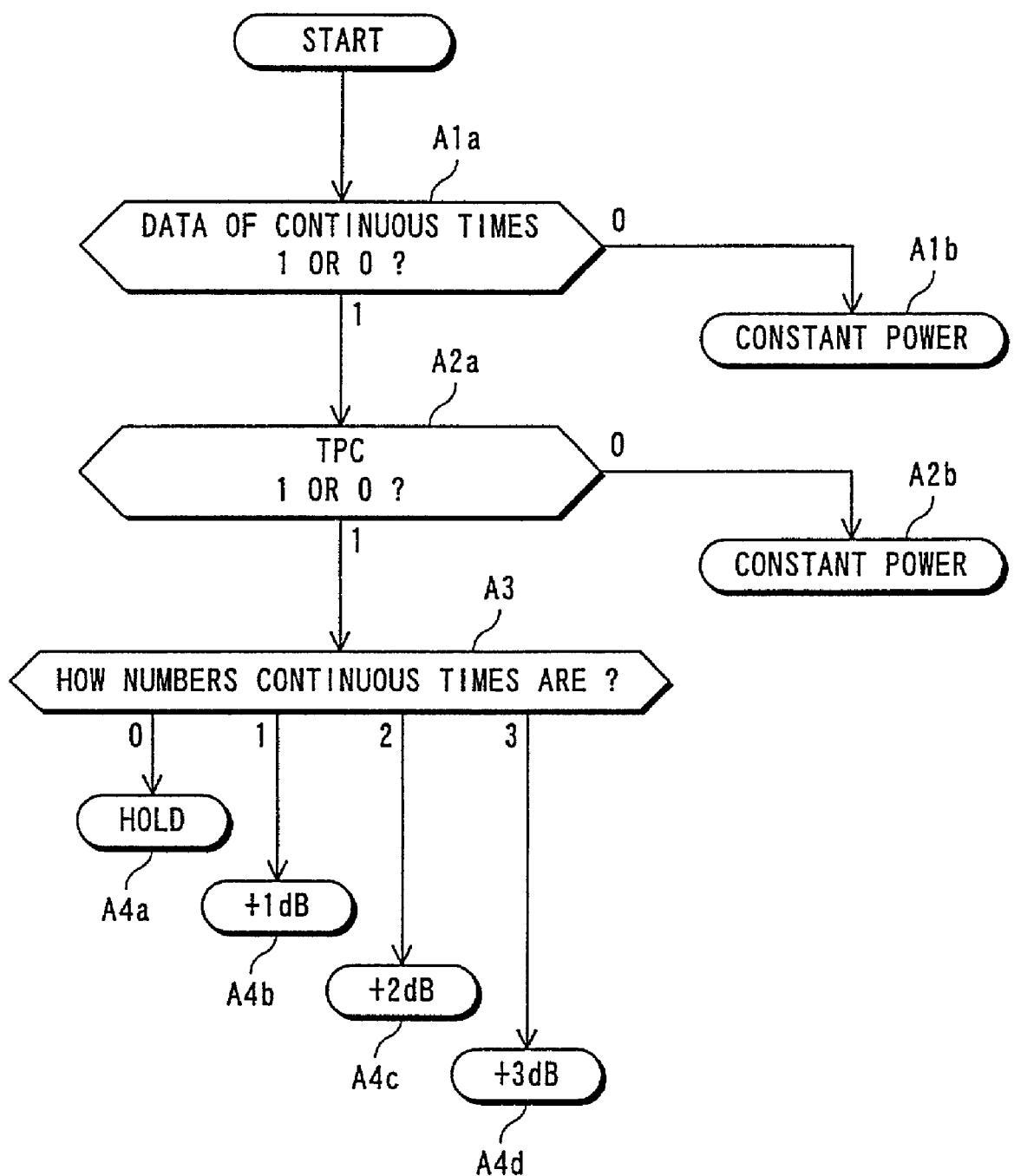
FIG. 12 is a flow chart illustrating control of a control unit according to the modification of the first embodiment of the present invention.

FIG. 12 is a flow chart illustrating control of the selection control unit 15a according to the modification of the first embodiment of the present invention. In Step A1a shown in FIG. 12, the selection control unit 15a continuously monitors the data as to the number of continuous times outputted from the TPC bits counter 22. When the data is 0, the data is caused to pass through a route indicated by 0 to control the transmission power to a constant power level in Step A1b. In Step A1a, the selection control unit 15a causes the data to pass through a route indicated by 1 to Step A2a when the data is another than 0.

In Step A2a, the selection control unit 15a determines whether TPC is executed or not on TPC bits inputted from the TPC bits extracting unit 16. When the TPC bits are one that cannot be demodulated, the selection control unit 15a causes the data to pass through a route 0 to control the transmission power to a constant power level in Step A2b. When the TPC bits can be demodulated in Step A2a on the other hand, the selection control unit 15a causes the data to pass through a route 1 to execute TPC according to the number of continuous times in Step A3.

Specifically, when the number of continuous times is 0 to 3 times, the selection control unit 15a causes the data to pass through routes indicated by 0 to 3, respectively, to execute 4 steps of Step A4a to Step A4d. Step A4a is a step where the number of continuous times is 0. In Step A4a, the selection control unit 15a keeps the transmission power constant. Step A4b to Step A4d are steps where the number of continuous times is 1 to 3, respectively. In Step A4b to Step A4d, the selection control unit 15a increases the transmission power of the transmitter amplifier 12a by +1 to +3 dB, respectively. When transmission cannot be continuously made, the number of continuous time is regarded as −1 to −3 to decrease the transmission power of the transmitter amplifier 12a.

In such a manner, the power control circuit 14a permits 3-stage control of suspension, execution and unexecution of TPC every frame on the basis of quality in the cellular mobile communication system making use of TPC. In addition, more stable quality can be secured, and increase in the quantity of channel interference can be prevented.

(B) Second Embodiment

The second embodiment relates to a method of setting a transmission power value to a suitable value so as to control a power value upon out-of-synchronism to a power value just before the counter operation of the forward protection is performed.

Figure 13:
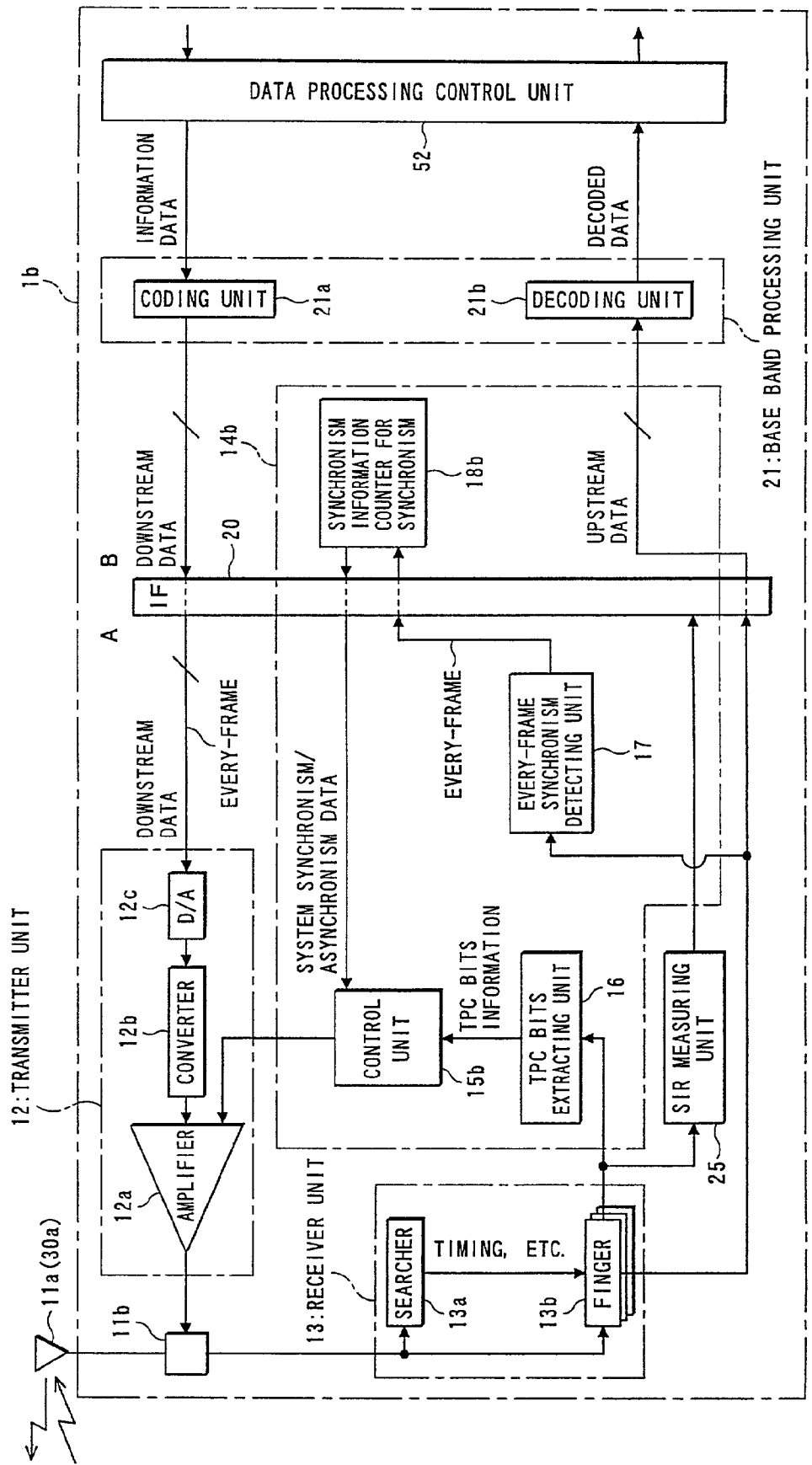
FIG. 13 is a diagram illustrating principal units of a transceiver unit in a base transceiver station according to a second embodiment of the present invention.

(6) Construction of Transceiver Circuit (Radio Transmission Apparatus) 1b:

FIG. 13 is a diagram illustrating principal units of a transceiver unit in a base transceiver station 10 according to the second embodiment of the present invention. A transceiver circuit 1b shown in FIG. 13 is equipped with TPC bits extracting unit 16 and an every-frame synchronism detecting unit 17, and moreover a synchronism information counter for synchronism 18b and a selection control unit 15b. The TPC bits extracting unit 16, every-frame synchronism detecting unit 17, synchronism information counter for synchronism 18b and selection control unit 15b cooperate with one another to function as a power control circuit 14b.

Those having the same reference characters as those described above among those shown in FIG. 13 mean like units. In the second embodiment as well, the method is performed in the cellular mobile communication system illustrated in FIG. 1. The transceiver circuit 1b shown in FIG. 13 may be used in a mobile station 30.

(6-1) Synchronism Information Counter for Synchronism 18b:

The synchronism information counter for synchronism 18b serves to compare the number of times that the every-frame synchronism detecting unit 17 has continuously detected asynchronism with a prescribed threshold value SS1 to output judgment data indicating asynchronism, and functions as an asynchronism judging unit.

(6-2) Selection Control Unit 15b:

The selection control unit 15b sets the transmission power value at the time the every-frame synchronism detecting unit 17 has first detected asynchronism as a transmission power value when the synchronism information counter for synchronism (asynchronism judging unit) 18b has outputted the judgment data indicating the asynchronism.

FIG. 14 is a block diagram illustrating a control method according to the second embodiment of the present invention. Those having the same reference characters as those described above among those shown in FIG. 14 mean like units.

Data inputted is inputted in both every-frame synchronism detecting unit 17 and TPC bits extracting unit 16. In the every-frame synchronism detecting unit 17, synchronism or asynchronism data is written in the synchronism information counter for synchronism 18b through the interface unit 20 (see FIG. 13) every frame. The synchronism information counter for synchronism 18b inputs system synchronism data or system asynchronism data in the selection control unit 15b.

The selection control unit 15b holds the transmission power value just before the counter for forward protection in its holding unit 50 and transmits a transmission signal of the transmission power value held at a constant power level when out-of-synchronism occurs. The selection control unit 15b executes TPC when synchronism is established. In other words, the selection control unit 15b outputs the transmission power value held correspondingly to the counter value from the synchronism information counter for synchronism 18b as a transmission power value.

The transmission power is thereby raised by 1 dB when system synchronism occurs, and the transmission power is raised by 2 dB or 3 dB when system synchronism continuously occurs 2 or 3 times. When system asynchronism occurs once, or continuously 2 or 3 times on the other hand, the transmission power is lowered by 1 dB or 2 or 3 dB. Accordingly, high-precision transmission power control becomes feasible.

(6-3) Operation:

By such a constitution, the synchronism information counter for synchronism 18b inputs timing that the counter for forward protection operates in the control unit 1b. The control unit 1b holds a power value just before such timing (i.e., power value just before the counter for forward protection operates) and performs constant transmission using the holding power value when out-of-synchronism information is inputted from the synchronism information counter for synchronism 18b.

(6-3-1) State Transition:

FIG. 15 is a diagram illustrating synchronism transition according to the second embodiment of the present invention. An axis of abscissa and an axis of ordinate shown in FIG. 15 denote time and a counter value, respectively. The counter value varies its value in 3 states. In the synchronous state shown in FIG. 15, the counter repeats up or down every frame. The synchronism information counter for synchronism 18b continuously monitors the synchronous state and informs the selection control unit 15b when the out-of-synchronism is detected continuously, for example, 3 times, and the selection control unit 15b starts counter operation for forward protection to hold the power value at Point P in the holding unit 50, and performs transmission at a power value having a counter value just before the forward protection as a counter value for the forward protection. The selection control unit 15b shifts to the synchronism-established state (Synchronism 2) in a state somewhat deteriorated in quality compared with the synchronous state (Synchronism 1) (see Point P).

TPC bits are easy to be erroneously received during the state of Synchronism 2 (during operation of forward protection), and the counter operation for the forward protection is performed. When shifted to the out-of-synchronism state, the selection control unit 15b continues to constantly output the power value at Point P with this transition.

Paying attention to the state transition (see FIG. 4), the selection control unit 15b transiently shifts from State S1 (synchronous state), in which transmission power control is being performed, to State S2, in which counter operation for forward protection is performed, upon shifting from State S1 to State S0 (out-of-synchronism). Thereafter, when the state completely becomes out of synchronism, the selection control unit 15b shifts from State S2 to State S0 and controls the transmission power value upon out-of-synchronism to the transition power value just before the counter operation for forward protection. The transmission power value is limited to a power value just before the operation, and a power value before 2 frames to 14 frames may also be used.

When the state is shifted from the synchronous state to the out of synchronous state as described above, the transmission power value in the out of synchronism state is set to a value just before the counter for forward protection.

When the prior art technique is used, the control unit has constantly transmitted a transmission power value just before the out-of-synchronism has occurred (i.e., during operation of forward protection) upon out-of-synchronism. Further, TPC bits received during operation of forward protection or backward protection is low in reliability, and the control unit provides a transmission power value on the basis of such TPC bits having low reliability and may have set a power value not power-controlled in some cases. Thus, the quality in the cellular mobile communication system may have been unable to be retained in some cases.

On the other hand, the power control circuit 1b does not use any power value under circumstances high in error probability, and uses a power value just before out-of-synchronism, and so any value low in reliability is not used.

As this, the cellular mobile communication system 100 can maintain a best quality.

As described above, in the second embodiment as well, the power control circuit 14b permits 3-stage control of suspension, execution and unexecution of TPC based on quality every frame in the cellular mobile communication system using TPC, so that more stable quality can be secured, and increase in the quantity of channel interference can be prevented.

(C) Third Embodiment

The third embodiment is an embodiment that whether TPC is executed or not is determined every slot and is different from the above embodiments that the determination is performed every frame.

Figure 16:
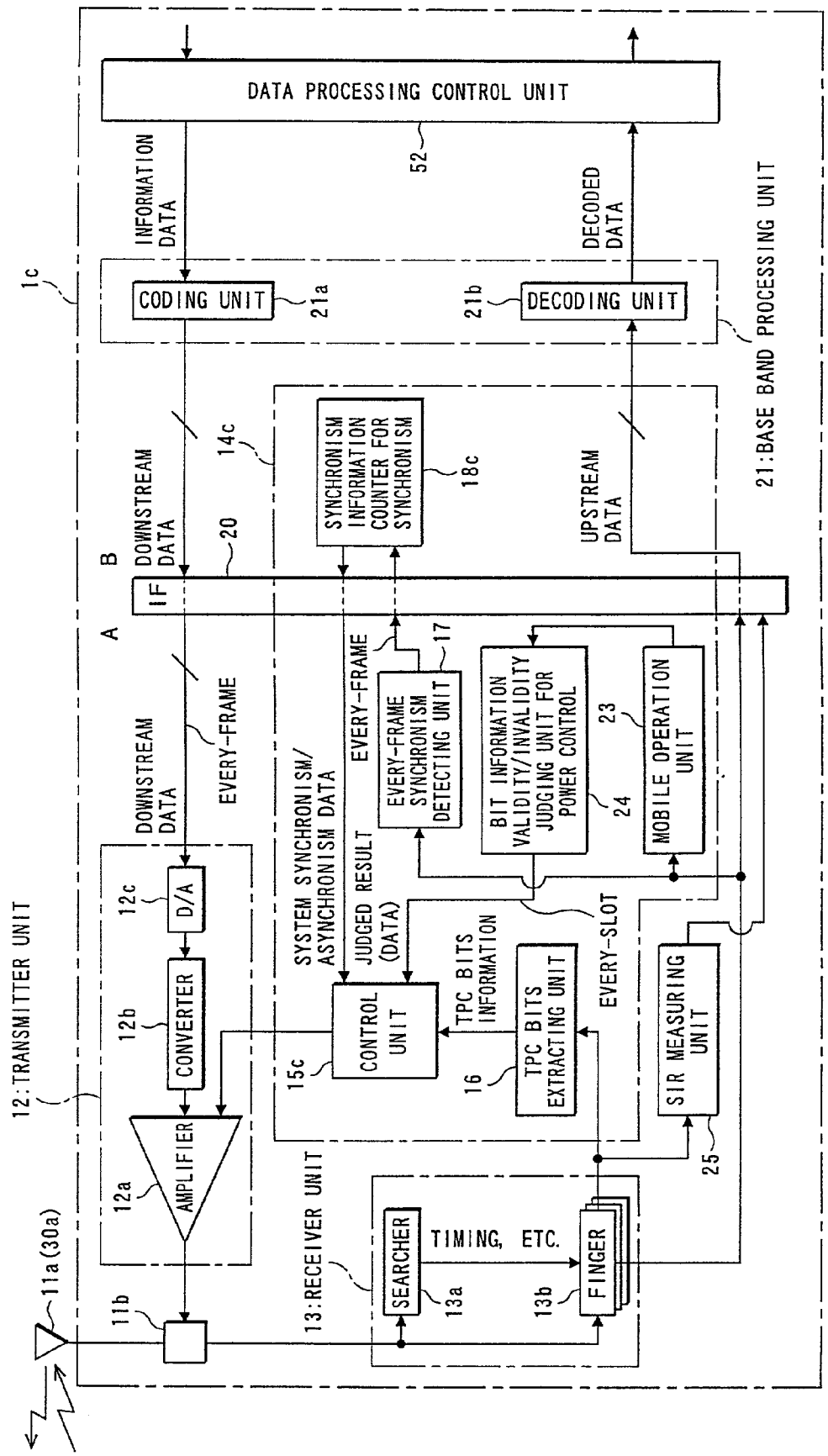
FIG. 16 is a diagram illustrating principal units of a transceiver unit in a base transceiver station according to a third embodiment of the present invention.

(7) Construction of Transceiver Circuit (Radio Transmission Apparatus) 1c:

FIG. 16 is a diagram illustrating principal units of a transceiver unit in a base transceiver station according to the third embodiment of the present invention. A power control circuit 14c in a transceiver circuit 1c shown in FIG. 16 is different from the power control circuits 14, 14a and 14b described above. The power control circuit 14c shown in FIG. 16 is equipped with an every-frame synchronism detecting unit 17, a synchronism information counter for synchronism 18 and TPC bits extracting unit 16, and moreover a mobile calculation unit (operation unit) 23 and a bit information validity/invalidity judging unit for power control 24.

Incidentally, the transceiver circuit 1c may be used in a mobile station 30.

(7-1) Mobile Calculation Unit 23:

The mobile calculation unit 23 extracts 15 pilot data from radio data every slot to output operation information as to error. The mobile calculation unit 23 makes a mobile calculation based on the number of slots, 15 indicating the number of mobile stations 30 accommodated to output operation information. The mobile calculation unit 23 can make a mobile calculation every 15 slots corresponding to 1 frame and also make a mobile calculation every slot.

The mobile calculation unit 23 can thereby change TPC during execution to unexecution or unexecuted TPC to execution in the course of reception of 1 frame.

(7-2) Bit Information Validity/invalidity Judging Unit for Power Control 24

The bit information validity/invalidity judging unit for power control 24 serves to judge whether TPC is executed or not on the basis of the operation information outputted from the mobile calculation unit 23. This bit information validity/invalidity judging unit for power control 24 counts the number of continuous times that the every-frame synchronism detecting unit 17 has continuously detected synchronism or asynchronism and compares this number of continuous times with a threshold value preset to judge synchronism/asynchronism.

Accordingly, the power control circuit 14c successively makes a mobile calculation by a number of slots corresponding to 1 frame and also makes an operation every slot to judge synchronism/asynchronism. When the prior art technique is used, judgment as to whether TPC is followed or not has been made every frame, and so it has taken a time for renewal of execution/unexecution of TPC. When the power control circuit 14c is used, however, this renewal time is speeded up.

(7-3) Selection Control Unit 15c:

The selection control unit 15c serves to select execution/unexecution of TPC using the TPC bits extracted in the TPC bits extracting unit 16 on the basis of the judged result of the bit information validity/invalidity judging unit for power control 24.

Figure 17:
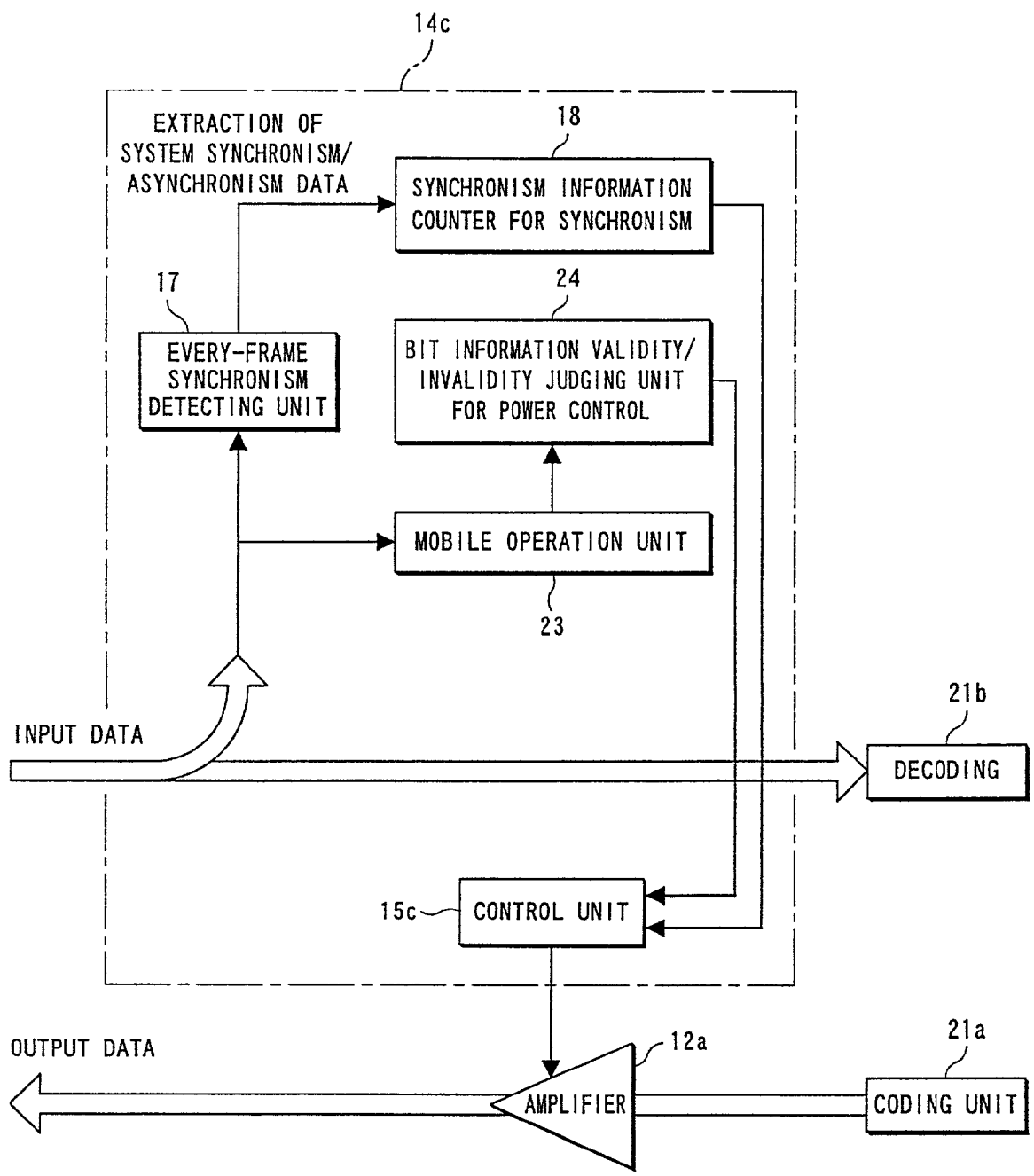
FIG. 17 is a block diagram illustrating a control method according to the third embodiment of the present invention.

FIG. 17 is a block diagram illustrating a control method according to the third embodiment of the present invention. The mobile calculation unit 23 contained in the power control circuit 14c shown in FIG. 17 is realized by causing CPU, ROM, RAM, etc. to cooperate with one another. Those having the same reference characters as described above mean like units.

Specifically, the mobile calculation unit 23 in the base transceiver station 10 calculates an error rate of pilot symbols of 90 bits (6 bits and 15 users) by comparing a pilot symbol received with a pilot symbol allotted in each mobile station 30 in advance every slot.

Since a circuit used in this mobile calculation unit 23 is the same circuit as in the ordinary mobile calculation operated every frame, the circuit can be shared.

In FIG. 17, input data is branchedly inputted in both every-frame synchronism detecting unit 17 and mobile calculation unit 23. In the every-frame synchronism detecting unit 17, synchronism/asynchronism data is inputted in the synchronism information counter for synchronism 18 at every-frame (see FIG. 16).

On the other hand, the input data is subjected to mobile calculation in the mobile calculation unit 23, and the result of the mobile calculation is outputted to the bit information validity/invalidity judging unit for power control 24 at a slot unit. The mobile calculation unit 23 is so designed that the result of the mobile calculation is not written in the interface unit 20 (see FIG. 16) which operates at every-frame, but directly inputted in the bit information validity/invalidity judging unit for power control 24 which operates at a slot unit.

The output from the synchronism information counter 18 is inputted in the selection control unit 15c at every-frame, and the output from the bit information validity/invalidity judging unit for power control 24 is inputted in the selection control unit 15c at a slot unit.

Accordingly, the input data is branched into 2 systems of processing every frame and processing every slot. Thus, a simple circuit is separately provided without changing the ordinary units for processing every frame, whereby transmission power can be rapidly controlled.

Since the interface unit 20 is not interposed, and the processing is not performed every slot, the reading and writing of data can be speeded up. Since the reading and writing of data are executed at every-frame, delicate control becomes feasible.

(7-4) Operation:

By such a constitution, the selection control unit 15*c* always makes operations by the number of slots corresponding to 1 frame, judges every slot, and at this time, successively judges using mobile calculations.

Figure 18:
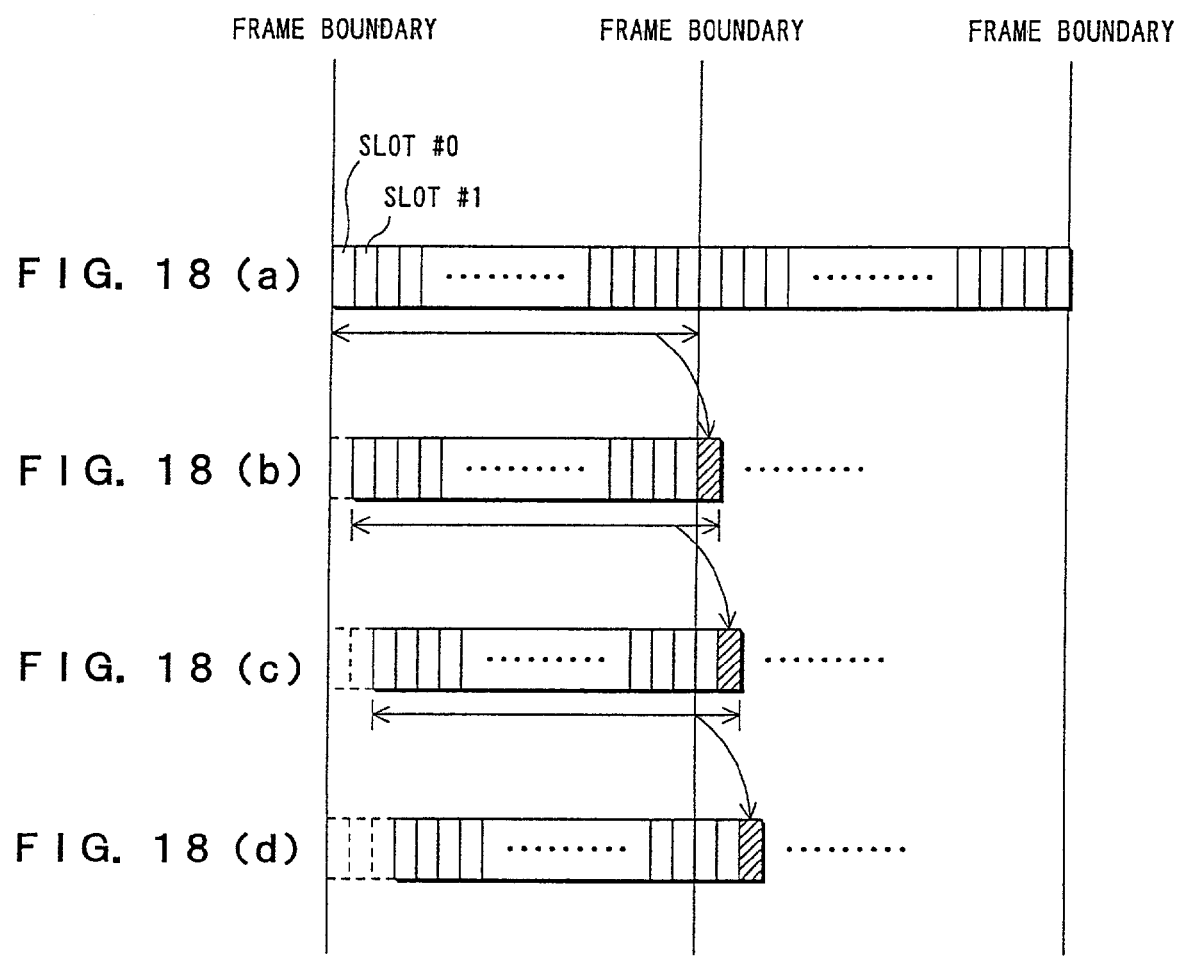
FIGS. 18($a$) through 18($d$) are diagrams respectively illustrating mobile calculations in the base transceiver station according to the third embodiment of the present invention.

FIGS. 18(*a*) through 18(*d*) are diagrams respectively illustrating mobile calculations in the base transceiver station 10 according to the third embodiment of the present invention, indicate that frames shown in FIG. 18(*a*) are shifted slot by slot and illustrate 3 frame boundaries. Frames are illustrated between these 3 frame boundaries. The result of a mobile calculation as to a radio signal that the base transceiver station 10 has received from a mobile station 30 is reflected on the next slot.

The two frames shown in FIG. 18(*a*) are objective frames which are operated by the mobile calculation unit 23. The mobile calculation unit 23 makes a mobile calculation on 15 slots (corresponding to the number of slots in one frame), Slot #0 to Slot #14 in the frame shown in FIG. 18(*a*) to reflect whether power control is executed or not on the next slot (that indicated by hatched lines in FIG. 18(*b*)). A mobile calculation is performed on 15 slots of Slot #1 in the previous frame to Slot #0 in the next frame to reflect whether power control is executed or not on a slot (that indicated by hatched lines) shown in FIG. 18(*c*). Similarly, a mobile calculation is made on 15 slots of Slot #2 in the previous frame to Slot #1 in the next frame to reflect whether power control is executed or not on a slot (that indicated by hatched lines) shown in FIG. 18(*d*).

Upon judgment of synchronism or asynchronism by the mobile calculation unit 23, the mobile calculation unit 23 judges whether quality is improved or not as to 15 slots (corresponding to the number of slots in 1 frame) at each shift time. When the quality is improved, the mobile calculation unit 23 makes power control on the next slot according to the TPC bits. When the quality is not improved, the mobile calculation unit 23 controls a transmission power value to the same power value as that in the previous slot.

TPC during execution can be thereby changed to unexecution in the course of reception of 1 frame, or unexecuted TPC can be changed to execution.

The synchronism in the mobile calculation unit 23 does not mean actual synchronism establishment, and a counter value for backward protection is not considered upon judgment of synchronism or asynchronism, whereby delicate control also becomes feasible without changing the constitution of an existing transceiver circuit 1.

The bit information validity/invalidity judging unit for power control 24 makes judgment every slot based on the system synchronism data or system asynchronism data (synchronism information) of the number of slots corresponding to 1 frame to transmit it to the power control unit 14*c*. The power control unit 14*c* reflects TPC on the next slot when validated or continues the power value in the previous slot.

As described above, the selection control unit 15*c* judges whether power control is performed according to TPC or not at a slot unit, not every-frame. Accordingly, execution/unexecution of TPC can be changed during reception of 1 frame.

Accordingly, when the base transceiver station 10 receives a deteriorated signal from, for example, the third slot among 15 slots, the base transceiver station 10 can raise transmission power from the next fourth slot taking the deterioration of the signal into consideration. Alternatively, when out-of-synchronism occurs in the third slot, the base transceiver station 10 can make transmission power constant to perform transmission. When a transmission condition is improved again in the 12th slot after the transmission power is raised in the fourth slot, the base transceiver station 10 can raise the transmission power again. In other words, transceiver power control can be delicately performed.

Since the mobile calculation is made by making the same mobile calculation as the case used for judgment of synchronism as to 15 slots corresponding to the number of slots in 1 frame, the control can be practiced without greatly changing an existing circuit or the like.

(8) Modifications:

By the way, the selection control unit 15*c* can make judgment as to whether TPC is followed or not at every N (N: a natural number slots from 1 to 14) slots.

This modification will hereinafter be described.

Although the mobile calculations shown in FIGS. 16 to 18(*d*) are such that validity/invalidity is judged by the number of slots in 1 frame, the mobile calculation in this modification is made every N slots.

Although This mobile calculation is made by the same operation as in the judgment of synchronism, it is necessary to separately provide a parameter because the judgment of validity/invalidity is judged by using N slots. For example, in the cellular mobile communication system in which synchronism establishment is conducted by using pilot symbols, synchronism establishment or synchronism unestablishment as to 1 frame is judged by whether the number of bits of the pilot symbols in the frame is normally judged or not. Thereafter, the number of continuous times of the synchronous frame is monitored to judge synchronism/asynchronism by whether a protective counter value is raised or not.

Preferably, synchronism establishment in 1 frame is not made when all the pilot symbols in such a frame are normally judged, and judgment to the effect of synchronism is made even when a unit of bits is erroneous. In other words, the so-called "allowable number of bits" is used, and for example, errors by 3 bits are judged to be synchronous.

Upon judgment of validity/invalidity of TPC, the judgment is made taking the allowable number of bits into consideration. When judgment is made every N slots, the allowable number of bits, P(N) as a function of N is separately set.

A bit information validity/invalidity judging unit for power control 11 first stores the system synchronism data or system asynchronism data (synchronism information) by N slots to conduct weighting by degree of importance and then judges validity/invalidity every slot. The validity/invalidity information is transmitted to a power control unit 3. The power control unit 3 reflects the power control bit information when validated or continues the power value in the previous slot.

Figure 19:
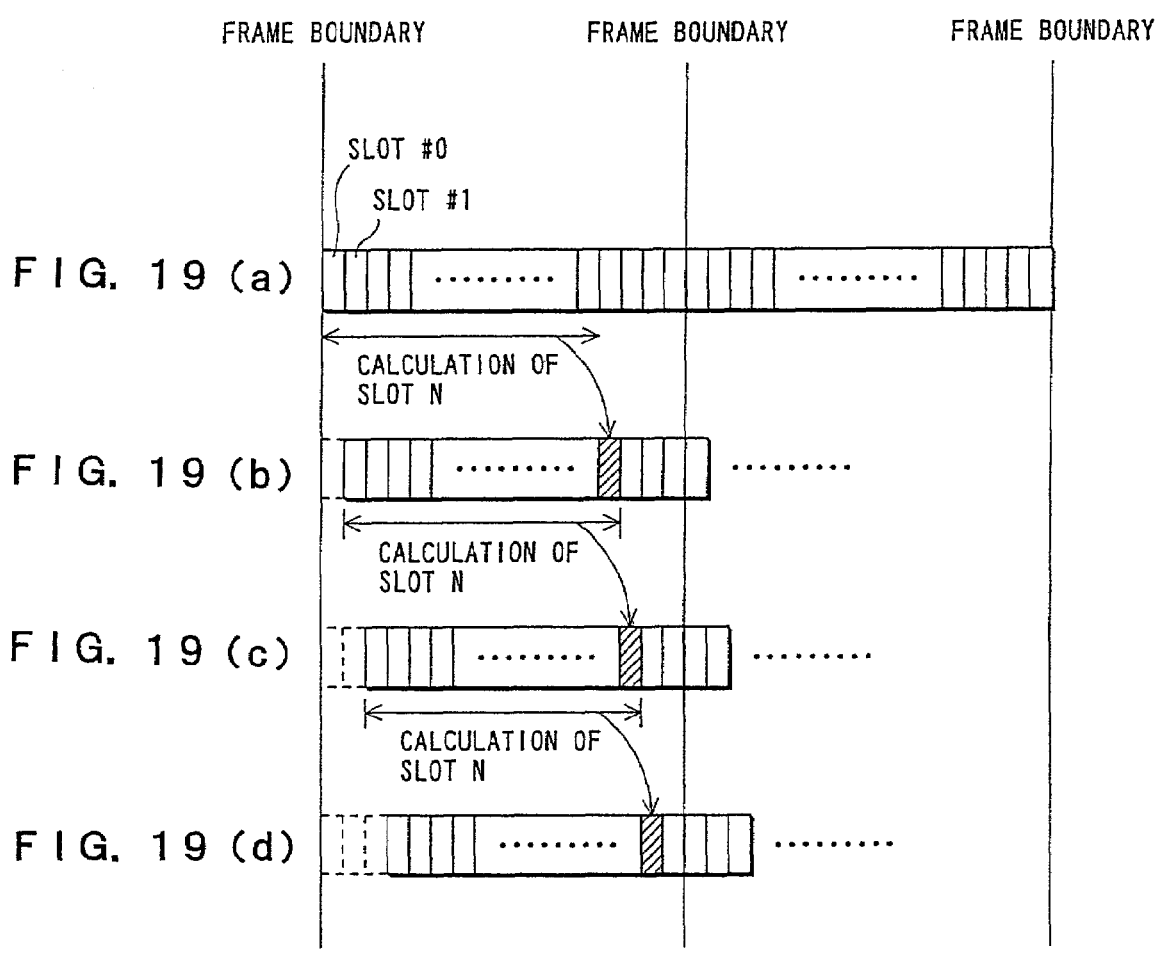
FIGS. 19($a$) through 19($d$) are diagrams respectively illustrating mobile calculations in a base transceiver station according to a modification of the third embodiment of the present invention.
Figure 20:
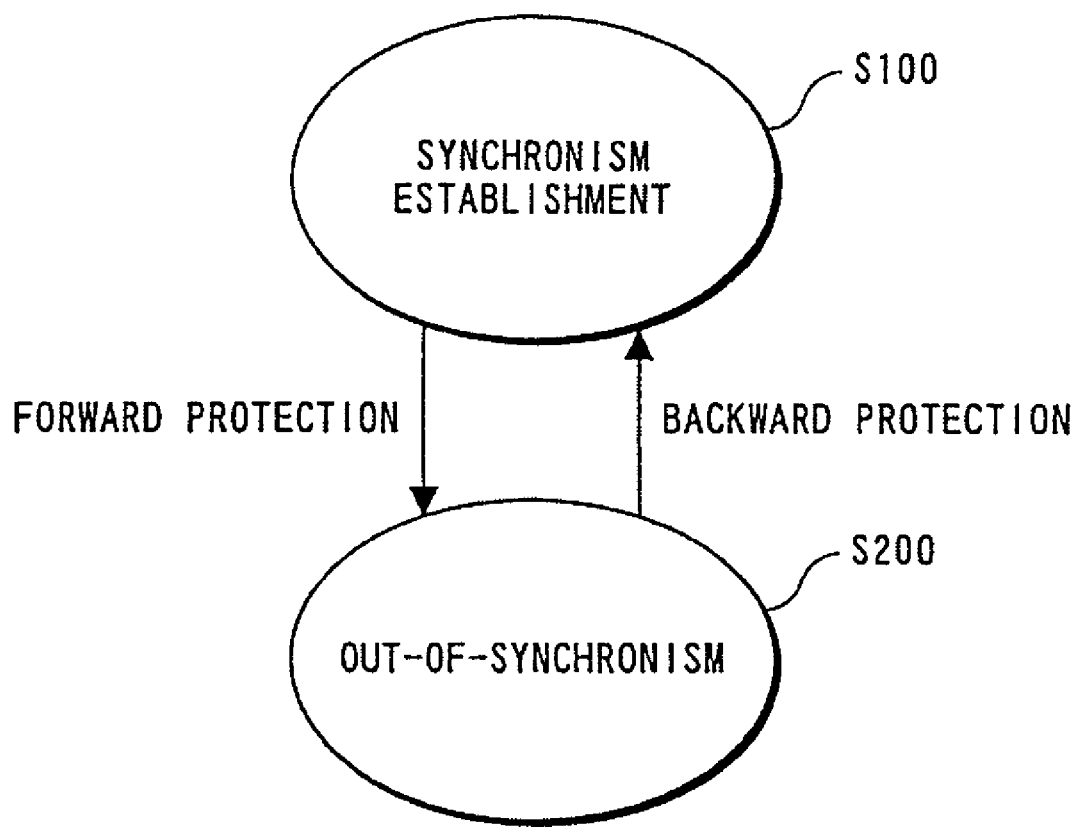
FIG. 20 is a diagram illustrating an example of state transition as to synchronism.

FIGS. 19(*a*) through 19(*d*) are diagrams respectively illustrating mobile calculations in a base transceiver station 10 according to the modification of the third embodiment of the present invention. In FIG. 19(*a*), 2 frames each having 15 slots are shown between 3 frame boundaries. The result of a mobile calculation as to a radio signal that the base transceiver station 10 has received from a mobile station 30 is reflected on the next slot.

The mobile calculation unit 23 makes a mobile calculation on N slots of Slot #0 to Slot #(N−1) to reflect whether power control is executed or not on the next slot (that indicated by hatched lines) in FIG. 19(b). A mobile calculation is performed on N slots of Slot #1 to Slot #N to reflect whether power control is executed or not. Similarly, a mobile calculation is made on N slots of Slot #2 to Slot #(N+1) to reflect whether power control is executed or not.

As described above, an operation is always made on slots corresponding to the number of slots in 1 frame irrespective of the concept of frame to conduct judgment every slot, and so transmission power control can be speeded up.

The base transceiver station 10 or mobile station 30 can easily find timing that a receiving state is deteriorated or improved by the mobile calculation.

(D) Others

The present invention should by no means be limited to these foregoing embodiments and modifications, and various changes or other modifications may be suggested without departing from the gist of the invention.

The present invention can practice even when a plurality of base transceiver stations 10 are present, and when transferred to other cells by hand-over.

The present invention can be applied to, for example, a radio system in a room of the W-CDMA system in addition to the cellular mobile communication system 100.

The invention claimed is:

1. A power control circuit comprising:
a synchronism detecting unit for detecting, every frame, whether a radio data is synchronized or in an out of synchronized state;
a synchronism/asynchronism judging unit for judging system synchronism when a predetermined first times of the synchronized state are continuously detected by the synchronism detecting unit, and for judging system asynchronism when a predetermined second times of the out of synchronized state are continuously detected by the synchronism detecting unit;
an execution/unexecution judging unit for judging execution of transmission power control of a transmission radio signal when a predetermined third times of the synchronized state are continuously detected by the synchronism detecting unit, which third times are independent from the first times and the second times, and for judging unexecution of the transmission power control when the third times of the synchronized state are not continuously detected;
a transmission power control information extracting unit for extracting transmission power control information contained in the radio data; and
a selection unit for selecting execution of the transmission power control as to rise or drop according to the transmission power control information extracted in the transmission power control information extracting unit when the execution/unexecution judging unit judges the execution, and for selecting unexecution of the transmission power control and keeping the transmission power constant when the execution/unexecution judging unit judges the unexecution.

2. A power control circuit comprising:
a synchronism detecting unit for detecting, every frame, whether a radio data is synchronized or in an out of synchronized state;
a synchronism/asynchronism judging unit for outputting judgment data indicating system synchronism when a prescribed first threshold times of the synchronized state are continuously detected by the synchronism detecting unit, and for outputting judgment data indicating system asynchronism when a prescribed second threshold times of the out of synchronized state are continuously detected by the synchronism detecting unit;
an execution/unexecution judging unit for outputting validity data indicating execution of transmission power control of a transmission radio signal when a prescribed third threshold times of the synchronized state are continuously detected by the synchronism detecting unit, which third threshold times are independent from the first and the second threshold times, and for outputting invalidity data indicating unexecution of the transmission power control when the third threshold times of the synchronized state are not continuously detected;
a transmission power control information extracting unit for extracting transmission power control information contained in the radio data; and
a selection unit for selecting execution of transmission power control as to rise or drop according to the transmission power control information extracted in the transmission power control information extracting unit when the synchronism/asynchronism judging unit outputs judgment data indicating system synchronism and the execution/unexecution judging unit outputs the validity date, and for selecting unexecution of the transmission power control when the synchronism/asynchronism judging unit output judgment data indicating asynchronism or the execution/unexecution judging unit outputs the invalidity data.

3. A power control circuit comprising:
a synchronism detecting unit for detecting, every frame, whether a radio data is synchronized or in an out of synchronized state;
an asynchronism judging unit for outputting judgment data indicating system asynchronism when a prescribed threshold times of the out of synchronized state are continuously detected by the synchronism detecting unit;
a transmission power control information extracting unit for extracting transmission power control information contained in the radio data; and
a control unit for setting a transmission power value to a value at a time the out of synchronized state is detected for a first of the prescribed threshold times in the synchronism detecting unit when the asynchronism judging unit has outputted the judgment data indicating the system asynchronism.

4. The power control circuit according to claim 1, wherein the selection unit is so constituted that execution/unexecution of the transmission power control is controlled on the basis of respective states of a synchronism-established state indicating radio synchronism establishment, an asynchronous state indicating out-of-radio synchronism and a transient state between the synchronism-established state and the asynchronous state.

5. The power control circuit according to claim 3, wherein the control unit is so constituted that execution/unexecution of the transmission power control is controlled on the basis of respective states of a synchronism-established state indicating radio synchronism establishment, an asynchronous state indicating out-of-radio synchronism and a transient state between the synchronism-established state and the asynchronous state.

6. The power control circuit according to claim 3, wherein the control unit is so constituted that a transmission power value held relating to a counter value provided in the synchronism/asynchronism judging unit is outputted as a transmission power value.

7. The power control circuit according to claim 3, wherein the synchronism/asynchronism judging unit is so constituted that a protective counter for forward protection or backward protection is used as the prescribed threshold value SS1.

8. A radio transmission apparatus comprising:
a transmitter unit for transmitting a first radio signal containing information data at a desired transmission power value; and
a power control circuit for controlling the transmission power value in the transmitter unit;
wherein the power control circuit comprises:
a synchronism detecting unit for detecting, every frame, whether a radio data is synchronized or in an out of synchronized state, which radio data is attributable to a second radio signal containing information data and transmission power control information transmitted by an opposite radio apparatus for radiocommunication;
a synchronism/asynchronism judging unit for judging system synchronism when a predetermined first times of the synchronized state are continuously detected by the synchronism detecting unit, and for judging system asynchronism when a predetermined second times of the out of synchronized state are continuously detected by the synchronism detecting unit;
an execution/unexecution judging unit for judging execution of transmission power control of the first radio signal when a predetermined third times of the synchronized state are continuously detected by the synchronism detecting unit, which third times are independent from the first times and the second times, and for judging unexecution of the transmission power control when the third times of the synchronized state are not continuously detected;
a transmission power control information extracting unit for extracting transmission power control information contained in the radio data; and
a selection unit for selecting execution of the transmission power control as to rise or drop according to the transmission power control information extracted in the transmission power control information extracting unit when the execution/unexecution judging unit judges the execution, and for selecting unexecution of the transmission power control and keeping the transmission power constant when the execution/unexecution judging unit judges the unexecution.

9. A radio transmission apparatus comprising:
a transmitter unit for transmitting a first radio signal containing information data at a desired transmission power value; and
a power control circuit for controlling the transmission power value in the transmitter unit;
wherein the power control circuit comprises:
a transmission power control information extracting unit for extracting transmission power control information contained in radio data attributable to a second radio signal containing information data transmitted by an opposite radio apparatus for radiocommunication;
a transmission power control information judging unit for judging execution of transmission power control when a predetermined times of the same kind of transmission power control information are continuously extracted by the transmission power control information extracting unit, and for judging unexecution of transmission power control when the predetermined times of the same kind of transmission power control information are not continuously extracted; and
a selection unit for selecting execution/unexecution of transmission power control on the basis of a judged result from the transmission power control information judging unit and transmission power value data corresponding to the judged result.

10. A radio transmission apparatus comprising:
a transmitter unit for transmitting a first radio signal containing information data at a desired transmission power value; and
a power control circuit for controlling the transmission power value in the transmitter unit;
wherein the power control circuit comprises:
a synchronism detecting unit for detecting, every frame, whether a radio data is synchronized or in an out of synchronized state, which radio data is attributable to a second radio signal containing information data and transmission power control information transmitted by an opposite radio apparatus for radiocommunication;
a synchronism/asynchronism judging unit for judging system synchronism when a predetermined first times of the synchronized state are continuously detected by the synchronism detecting unit, and for judging system asynchronism when a predetermined second times of the out of synchronized state are continuously detected by the synchronism detecting unit, said synchronism/asynchronism judging unit outputting judgment data indicating system asynchronism after judging system asynchronism;
a transmission power control information extracting unit for extracting transmission power control information contained in the radio data; and
a control unit for setting a transmission power value to a value at a time the out of synchronized state is detected a first of the predetermined second times in the synchronism detecting unit when the synchronism/asynchronism judging unit has outputted judgment data indicating system asynchronism.

* * * * *